(12) United States Patent
Meng et al.

(10) Patent No.: US 11,876,226 B2
(45) Date of Patent: Jan. 16, 2024

(54) CU$_2$S-BASED SUPERIOR ANODE FOR SODIUM-ION BATTERIES

(71) Applicant: BOARD OF TRUSTEES OF THE UNIVERSITY OF ARKANSAS, Fayetteville, AR (US)

(72) Inventors: Xiangbo Meng, Fayetteville, AR (US); Jiyu Cai, Naperville, AR (US)

(73) Assignee: Board Of Trustees Of The University Of Arkansas, Fayetteville, AR (US)

( * ) Notice: Subject to any disclaimer, the term of this patent is extended or adjusted under 35 U.S.C. 154(b) by 0 days.

(21) Appl. No.: 17/156,391

(22) Filed: Jan. 22, 2021

(65) Prior Publication Data

US 2021/0226215 A1 Jul. 22, 2021

Related U.S. Application Data

(60) Provisional application No. 62/964,530, filed on Jan. 22, 2020.

(51) Int. Cl.
*H01M 4/58* (2010.01)
*H01M 10/054* (2010.01)
*H01M 4/36* (2006.01)
*H01M 4/136* (2010.01)
*H01M 4/62* (2006.01)
*H01M 4/02* (2006.01)

(52) U.S. Cl.
CPC ......... *H01M 4/5815* (2013.01); *H01M 4/136* (2013.01); *H01M 4/366* (2013.01); *H01M 4/625* (2013.01); *H01M 10/054* (2013.01); *H01M 2004/027* (2013.01)

(58) Field of Classification Search
None
See application file for complete search history.

(56) References Cited

PUBLICATIONS

Zhu, Xinxin et al. "Dual carbon-protected metal sulfides and their application to sodium-ion battery anodes". Journal of Materials Chemistry A: Materials for Energy and Sustainability (2018), 6(27), 13294-13301.*
Slater MD, Kim D, Lee E, Johnson CS. Sodium-ion batteries. *Advanced Functional Materials.* 2013;23(8):947-958.
Moreau P, Guyomard D, Gaubicher J, Boucher F. Structure and stability of sodium intercalated phases in olivine FePO4. *Chemistry of Materials.* 2010;22(14):4126-4128.
Jache B, Adelhelm P. Use of graphite as a highly reversible electrode with superior cycle life for Sodium-Ion batteries by making use of Co-Intercalation phenomena. *Angewandte Chemie.* 2014;126(38):10333-10337.
Stevens D, Dahn J. The mechanisms of lithium and sodium insertion in carbon materials. *J Electrochem Soc.* 2001; 148(8):.A803-A811.
Stevens D, Dahn J. High capacity anode materials for rechargeable sodium-ion batteries. *J Electrochem Soc.* 2000; 147(4):1271-1273.

(Continued)

*Primary Examiner* — Laura Weiner
(74) *Attorney, Agent, or Firm* — Keith A. Vogt; Keith Vogt, Ltd.

(57) ABSTRACT

As anode having an anode material, a current collector, a graphene-based material, and the graphene-based material covers the anode material.

1 Claim, 18 Drawing Sheets

(56) References Cited

PUBLICATIONS

Zou W, Li J, Deng Q, et al. Microspherical Na2Ti3O7 prepared by spray-drying method as anode material for sodium-ion battery. *Solid State Ionics.* 2014;262:192-196. Repeat with 37.

Klein F, Jache B, Bhide A, Adelhelm P. Conversion reactions for sodium-ion batteries. *Physical Chemistry Chemical Physics.* 2013; 15(38):15876-15887.

Putnis A. Electron diffraction study of phase transformations in copper sulfides. *Am Mineral.* 1977;62(1-2):107-114.

Boebinger MG, Xu M, Ma X, Chen H, Unocic RR, McDowell MT. Distinct nanoscale reaction pathways in a sulfide material for sodium and lithium batteries. *Journal of Materials Chemistry A.* 2017;5(23):11701-11709.

Jing M, Li F, Chen M, et al. Facile synthetic strategy to uniform Cu9S5 embedded into carbon: A novel anode for sodium-ion batteries. *J Alloys Compounds.* 2018;762:473-479.

MH Han, E Gonzalo, G Singh, T Rojo, A comprehensive review of sodium layered oxides: powerful cathodes for Na-ion Energy & Environmental Science. 8 (2015) 81-102.

GH Newman, LP Klemann, Ambient Temperature cycling of an Na—$TiS_2$ Cell; J.Electrochem.Soc. 127 (1980) 2097-2099.

A Manthiram, X Yu, Ambient Temperature sodium-Sulfur Batteries; Concept; Materials Views; 11 (2015) 2108-2114.

N Pu, Y Peng, P Wang, C Chen, J Shi, Y Liu, et al., Application of nitrogen-doped graphene nanosheets in electrically conductive adhesives; Carbon. 67 (2014) 449-456.

Wu L, Lu H, Xiao L, et al. A tin (ii) sulfide-carbon anode material based on combined conversion and alloying reactions for sodium-ion batteries. *Journal of Materials Chemistry A.* 2014;2(39):16424-16428.

Y Liu, X Wang, J Cai, X Han, D Geng, J Li, et al., Atomic-scale tuned interface of nickel-rich cathode for enhanced electrochemical performance in lithium-ion batteries; Journal of Materials Science & Technology. (2020).

J Mao, X Fan, C Luo, C Wang, Building Self-Healing Alloy Architecture for Stable Sodium-Ion Battery Anodes: A Case Study of Tin anode Materials; ACS applied materials & interfaces. 8 (2016) 7147-7155.

Y. Fang, X. Yu, X.W. Lou, Bullet-like Cu9S5 Hollow Particles Coated with Nitrogen-Doped Carbon for Sodium-Ion Batteries; Angewandte Chemie. 131 (2019) 7826-7830. Repeat with 54, 74, and 85.

MS Whittingham, Chemistry of Intercalation Compounds: Metal Guests in Chalcogenide Hosts; Progress in Solid State Chemistry. 12 (1978) 41-99.

W Li, S Hu, X Luo, Z Li, X Sun, M Li, et al., Confined Amorphous Red Phosphorus in MOF-Derived N-Doped Microporous Carbone as a Superior Anode by Odium-Ion Battery; Adv Mater. 29 (2017) 1605820.

A. Qin, H. Wu, J. Chen, T. Li, S. Chen, D. Zhang, et al., Constructing hyperbranched polymers as a stable elastic framework for copper sulfide nanoplates for enhancing sodium-storage performance; Nanoscale. 11 (2019) 7188-7198.

H. Li, K. Wang, S. Cheng, K. Jiang, Controllable Electrochemical Synthesis of Copper Sulfides as Sodium-Ion Battery Anodes with Superior Rate Capability and Ultralong Cycle Life; ACS applied materials & interfaces. 10 (2018) 8016-8025. Repeat with 52, 72, and 83.

Q. Chen, M. Ren, H. Xu, W. Liu, J. Hei, L. Su, et al., $Cu_2S$@ N, S Dual-Doped Carbon matrix Hybrid as Superior Anode Materials for Lithium/Sodium ion batteries; ChemElectroChem. 5 (2018) 2135-2141.

Z Yang, J Zhang, MC Kintner-Meyer, X Lu, D Choi, JP Lemmon, et al., Electrochemical Energy Storage for Green Grid; Chem.Rev. 111 (2011) 3577-3613.

A Putnis, Electron diffraction study of phase transformations in copper sulfides; Am.Mineral. 62 (1977) 107-114.

S Yuan, X Huang, D Ma, H Wang, F Meng, X Zhang, Engraving Copper Foil to Give Large-Scale Binder-Free Porous CuO Arrays for a High-Performance Sodium-Ion Battery Anode; Adv Mater. 26 (2014) 2273-2279.

PK Dutta, UK Sen, S Mitra, Excellent electrochemical performance of tin monosulphide (SnS) as a sodium-ion battery anode; RSC Advances. 4 (2014) 43155-43159.

M. Jing, F. Li, M. Chen, J. Zhang, F. Long, L. Jing, et al., Facile synthetic strategy to uniform $Cu_9S_5$ embedded into carbon: A novel anode for sodium-ion batteries; J.Alloys Compounds. 762 (2018) 473-479.

L Baggetto, JK Keum, JF Browning, GM Veith, Germanium as negative electrode materials for sodium,-ion batteries; Electrochemistry Communications. 34 (2013) 41-44.

Y Kim, K Ha, SM Oh, KT Lee, High-Capacity Anode Materials for Sodium-Ion Batteries; Chemistry-A European Journal. 20 (2014) 11980-11992.

S Oh, J Hwang, CS Yoon, J Lu, K Amine, I Belharouak, et al., ACS applied materials & interfaces. 6 (2014) 11295-11301.

A Rudola, K Saravanan, CW Mason, P Balaya, $Na_2Ti_3O_7$: an intercalation based anode for sodium-ion battery applications; Journal of Materials Chemistry A. 1 (2013) 2653-2662.

W Luo, F Shen, C Bommier, H Zhu, X Ji, L Hu, Na-Ion Battery Anodes: Materials and Electrochemistry; Acc.Chem.Res. 49 (2016) 231-240.

M Dahbi, N Yabuuchi, K Kubota, K Tokiwa, S Komaba, Negative electrodes for Na-ion batteries; Physical chemistry chemical physics. 16 (2014) 15007-15028.

A Metrot, D Guerard, D Billaud, A Herold, New Results About the Sodium-Graphite System; Synth.Met. 1 (1980) 363-369.

L Lapteva, YV Fedoseeva, E Shlyakhova, A Makarova, L Bulusheva, A Okotrub, NEXAFS spectroscopy study of lithium interaction with nitrogen incorporated in porous graphitic material; J.Mater.Sci. 54 (2019) 11168-11178.

J Cai, B Reinhart, P Eng, Y Liu, C Sun, H Zhou, et al., Nitrogen-doped graphene-wrapped $Cu_2S$ as a superior anode in sodium-ion batteries; Carbon. 170 (2020) 430-438.

O Ellabban, H Abu-Rub, F Blaabjerg, Renewable energy resources: Current status, future prospects and their enabling technology; Renewable and Sustainable Energy Reviews. 39 (2014) 748-764.

N Yabuuchi, K Kubota, M Dahbi, S Komaba, Research Development on Sodium-Ion Batteries; Chem.Rev. 114 (2014) 11636-11682.

N Panwar, S Kaushik, S Kothari, Role of renewable energy sources in environmental protection: A review; Renewable and Sustainable Energy Reviews. 15 (2011) 1513-1524.

X Xiong, C Yang, G Wang, Y Lin, X Ou, J Wang, et al., SnS nanoparticles electrostatically anchored on three-dimensional N-doped graphene as an active and durable anode for sodium-ion batteries; Energy & Environmental Science. 10 (2017) 1757-1763.

J Ming, H Ming, W Kwak, C Shin, J Zheng, Y Sun, The binder effect on an oxide-based anode in lithium and sodium-ion battery applications: the fastest way to ultrahigh performance; Chemical Communications. 50 (2014) 13307-13310.

BJ Wuensch, M Buerger, The Crystal Structure of Chalcocite, $Cu_2S$, Mineral Soc Am Spec Paper. 1 (1963) 164-170.

J. Kim, D. Kim, G. Cho, T. Nam, K. Kim, H. Ryu, et al., the electrochemical properties of copper sulfide as cathode material for rechargeable sodium cell at room temperature; J.Power Sources. 189 (2009) 864-868.

X Deng, Z Chen, Y Cao, Transition metal oxides based on conversion reaction for sodium-ion battery anodes; Materials today chemistry. 9 (2018) 114-132.

M Hu, H Zhou, X Gan, L Yang, Z Huang, D Wang, et al., Journal of Materials Chemistry A. 6 (2018) 1582-1589.

Y Liu, N Zhang, L Jiao, Z Tao, J Chen, Ultrasmall Sn Nanoparticles Embedded in Carbon as High-Performance anode for Sodium-Ion Batteries; Advanced Functional Materials. 25 (2015) 214-220.

R Dai, W Sun, Y Wang, Ultrasmall Tin Nanodotes Embedded in Nitrogen-Doped Mesoporous Carbon: Metal-Organic-Framework Derivation and Electrochemical Applications as Highly Stable Anode for Lithium Ion Batteries; Electrochim.Acta. 217 (2016) 123-131.

H. Park, J. Kwon, H. Choi, D. Shin, T. Song, X.W.D. Lou, Unusuan Na+ Ion Intercalation/Deintercalation in Metal-Rich Cu1.8S for Na-Ion Batteries; ACS nano. 12 (2018) 2827-2837.

(56) References Cited

PUBLICATIONS

SP Ong, VL Chevrier, G Hautier, A Jain, C Moore, S Kim, et al., Voltage, Stability and Diffusion Barrier differences between Soidum-ion and Lithium-ion Intercalation Materials; Energy & Environmental Science. 4 (2011) 3680-3688.

Abel et al; Nanocolumnar Germanium Thin Films as a High-Rate Sodium-Ion Battery Anode Material; J. Physical Chemistry; dx.doi.org/10.1021/jp407322k | J. Phys. Chem. C 2013, 117, 18885-18890; ACS Publication; US.

Lu et al; Nitrogen-Doped Graphene Materials for Supercapacitor Applications; J. Nanoscience & Nanotechnology; vol. 14, 1134-1144, 2017; American Scientific Publishers; US.

Dalard, et al.; Organic electrolytes for corrosion testing of aluminium and Al-Li binary alloys; J. Applied Electrochemistry; 19; 1989; 157-161; Chapman and Hall Ltd; US.

Li et al; Role of carbon defects in the reversible alloying states of red phosphorus composite anodes for efficient sodium ion batteries; J. Mater. Chem. A, 2017, 5, 5266; Royal Society of Chemistry; London, UK.

Rehr et al.; Theoretical approaches to x-ray absorption fine structure; Reviews of Modern Physics, vol. 72, No. 3, Jul. 2000; The American Physical Society; US.

Ong, Shyue Ping et al. "Voltage, Stability and Diffusion Barrier Differences Between Sodium-ion and Lithium-ion Intercalation Materials." Energy & Environmental Science 4.9 (2011): 3680. Web; Royal Society of Chemistry; London, UK.

Han MH, Gonzalo E, Singh G, Rojo T. A comprehensive review of sodium layered oxides: Powerful cathodes for na-ion batteries. *Energy & Environmental Science*. 22 pages; 2015;8(1):81-102.

J Song, Z Yu, ML Gordin, D Wang, Advanced Sulfur Cathode Enabled by Highly Crumpled Nitrogen-Doped Graphene Sheets for High-Energy-Density Lithium-Sulfur Batteries; 7 pages; Nano letters. 16 (2016) 864-870.

A Smith, J Burns, J Dahn, A High Precision Study of the Coulombic Efficiency of Li-Ion Batteries; 4 pages; Electrochemical and Solid State Letters. 13 (2010) A177.

Zhang S, Jow T. Aluminum corrosion in electrolyte of li-ion battery. 7 pages; *J Power Sources*. 2002; 109(2):458-464.

Newman GH, Klemann LP. Ambient temperature cycling of an Na—TiS2 cell. 4 pages; *J Electrochem Soc*. 1980;127(10):2097-2099.

Manthiram A, Yu X. Ambient temperature sodium-sulfur batteries. 7 pages; *Small*. 2015;11(18):2108-2114.

Y Wang, X Feng, Y Xiong, S Stoupin, R Huang, M Zhao, et al., an Innovative Lithium Ion Battery System Based on a $Cu_2S$ Anode Material; 10 pages; ACS Applied Materials & Interfaces. (2020).

N Pu, Y Peng, P Wang, C Chen, J Shi, Y Liu, et al., Application of nitrogen-doped graphene nanosheets in electrically conductive adhesives; 8 pages; Carbon. 67 (2014) 449-456.

Y Zhao, LP Wang, MT Sougrati, Z Feng, Y Leconte, A Fisher, et al., A Review on Design Strategies for Carbon Based Metal Oxides and Sulfides Nanocomposites for High Performance Li and Na Ion Battery Anodes; 70 pages; Advanced Energy Materials. 7 (2017) 1601424.

T Yang, T Qian, M Wang, X Shen, N Xu, Z Sun, et al., A Sustainable Route from Biomass Byproduct Okara to High Content Nitrogen-Doped Carbon Sheets for Efficient Sodium Ion Batteries; 7 pages; Adv Mater. 28 (2016) 539-545.

L Wu, H Lu, L Xiao, J Qian, X Ai, H Yang, et al., A tin(II) sulfide-carbon anode material based on combined conversion and alloying reactions for sodium-ion batteries; 5 pages; Journal of Materials Chemistry A. 2 (2014) 16424-16428.

Q Sun, KC Lau, D Geng, X Meng, Atomic and Molecular Layer Deposition for Superior Lithium-Sulfur Batteries: Strategies, Performance, and Mechanisms; 28 pages; Batteries & Supercaps. 1 (2018) 41-68.

C Luo, H Zhu, W Luo, F Shen, X Fan, J Dai, et al., Atomic-Layer-Deposition Functionalized Carbonized Mesoporous Wood Fiber for High Sulfur Loading Lithium Sulfur Batteries; 7 pages; ACS applied materials & interfaces. 9 (2017) 14801-14807.

X Meng, Atomic-scale surface modifications and novel electrode designs for high-performance sodiumion batteries via atomic layer deposition; 23 pages; Journal of Materials Chemistry A. 5 (2017) 10127-10149.

Mao J, Fan X, Luo C, Wang C. Building self-healing alloy architecture for stable sodium-ion battery anodes: A case study of tin anode materials. 9 pages; *ACS applied materials & interfaces*. 2016;8(11):7147-7155.

Fang Y, Yu X, Lou XW. Bullet-like Cu9S5 hollow particles coated with Nitrogen-Doped carbon for Sodium-Ion batteries. 5 pages; *Angewandte Chemie*. 2019;131(23):7826-7830.

Whittingham MS. Chemistry of intercalation compounds: Metal guests in chalcogenide hosts. 30 pages; *Progress in Solid State Chemistry*. 1978;12(1):41-99.

Li W, Hu S, Luo X, et al. Confined amorphous red phosphorus in MOF-Derived N-Doped microporous carbon as a superior anode for Sodium-Ion battery. 8 pages; *Adv Mater*. 2017;29(16):1605820.

Qin A, Wu H, Chen J, et al. Constructing hyperbranched polymers as a stable elastic framework for copper sulfide nanoplates for enhancing sodium-storage performance. 11 pages; *Nanoscale*. 2019;11(15):7188-7198.

Li H, Wang K, Cheng S, Jiang K. Controllable electrochemical synthesis of copper sulfides as sodium-ion battery anodes with superior rate capability and ultralong cycle life. 10 pages; *ACS applied materials & interfaces*. 2018;10(9):8016-8025.

F Klein, B Jache, A Bhide, P Adelhelm, Conversion reactions for sodium-ion batteries; 12 pages; Physical Chemistry Chemical Physics. 15 (2013) 15876-15887.

Braithwaite J, Nagasubramanian G, Gonzales A, Lucero S, Cieslak W. Corrosion of current-collector material in li-ion cells. 10 pages; *Lithium Polymer Batteries*. 1997:44-51.

Chen Q, Ren M, Xu H, et al. Cu2S@ N, S Dual-Doped carbon matrix hybrid as superior anode materials for lithium/sodium ion batteries. 7 pages; *ChemElectroChem*. 2018;5(15):2135-2141.

K Jiang, Z Chen, X Meng, CuS and Cu2S as Cathode Materials for Lithium Batteries: A Review; 16 pages; ChemElectroChem. 6 (2019) 2825-2840.

DT Pham, B Sambandam, S Kim, J Jo, S Kim, S Park, et al., Dandelion-shaped manganese sulfide in etherbased electrolyte for enhanced performance sodium-ion batteries; 14 pages; Communications Chemistry. 1 (2018) 1-14.

MG Boebinger, M Xu, X Ma, H Chen, RR Unocic, MT McDowell, Distinct nanoscale reaction pathways in a sulfide material for sodium and lithium batteries; 9 pages; Journal of Materials Chemistry A. 5 (2017) 11701-11709.

Yang Z, Zhang J, Kintner-Meyer MC, et al. Electrochemical energy storage for green grid. 37 pages; *Chem Rev*. 2011;111(5):3577-3613.

H Shuai, J Li, F Jiang, X Zhang, L Xu, J Hu, et al., Electrochemically intercalated intermediate induced exfoliation of few-layer $MoS_2$ from molybdenite for long-life sodium storage; 13 pages; Science China Materials. (2020) 1-13.

A Putnis, Electron diffraction stufy of phase transformations in copper sulfides; 8 pages; Am. Mineral. 62 (1977) 107-114.

Yuan S, Huang X, Ma D, Wang H, Meng F, Zhang X. Engraving copper foil to give Large-Scale Binder-Free porous CuO arrays for a High-Performance Sodium-Ion battery anode. 7 pages; *Adv Mater*. 2014;26(14):2273-2279.

Dutta PK, Sen UK, Mitra S. Excellent electrochemical performance of tin monosulphide (SnS) as a sodium-ion battery anode. 5 pages; *RSC Advances*. 2014;4(81):43155-43159.

S Sarwar, A Nautiyal, J Cook, Y Yuan, J Li, S Uprety, et al., Facile microwave approach towards high performance MoS2/graphene nanocomposite for hydrogen evolution reaction; 13 pages; Science China Materials. 63 (2020) 62-74.

Baggetto L, Keum JK, Browning JF, Veith GM. Germanium as negative electrode material for sodium-ion batteries. 4 pages; *Electrochemistry Communications*. 2013;34:41-44.

Kim Y, Ha K, Oh SM, Lee KT. High-capacity anode materials for sodium-ion batteries. 13 pages; *Chemistry—A European Journal*. 2014;20(38):11980-11992.

(56) References Cited

PUBLICATIONS

D Stevens, J Dahn, High Capacity Anode Materials for Rechargeable Sodium-Ion Batteries; 4 pages J.Electrochem.Soc. 147 (2000) 1271-1273.

Oh S, Hwang J, Yoon CS, et al. High electrochemical performances of microsphere C—$TiO_2$ anode for sodium-ion battery. 7 pages; *ACS applied materials & interfaces.* 2014;6(14):11295-11301.

N Mahmood, C Zhang, F Liu, J Zhu, Y Hou, Hybrid of Co3Sn2@Co Nanoparticles and Nitrogen-Doped Graphene as a Lithium Ion Battery Anode; 12 pages; ACS nano. 7 (2013) 10307-10318.

Wan J, Shen F, Luo W, et al. In situ transmission electron microscopy observation of sodiation—desodiation in a long cycle, high-capacity reduced graphene oxide sodium-ion battery anode, 8 pages. *Chemistry of Materials.* 2016;28(18):6528-6535.

Y Zhao, J Wang, C Ma, Y Li, J Shi, Z Shao, Interconnected graphene nanosheets with confined $FeS_2$/FeS binary nanoparticles as anode material of sodium-ion batteries; 10 pages; Chem.Eng.J. 378 (2019) 122168.

Rudola A, Saravanan K, Mason CW, Balaya P. $Na_2Ti_3O_7$: An intercalation based anode for sodium-ion battery applications. 10 pages; *Journal of Materials Chemistry A.* 2013;1(7):2653-2662.

Luo W, Shen F, Bommier C, Zhu H, Ji X, Hu L. Na-ion battery anodes: Materials and electrochemistry. 10 pages; *Acc Chem Res.* 2016;49(2):231-240.

Abel PR, Lin Y, de Souza T, et al. Nanocolumnar germanium thin films as a high-rate sodium-ion battery anode material, 6 pages;. *The Journal of Physical Chemistry C.* 2013;117(37):18885-18890.

H Lin, M Li, X Yang, D Yu, Y Zeng, C Wang, et al. Nanosheets-Assembled CuSe Crystal Pillar as a Stable and High-Power Anode for Sodium-Ion and Potassium-Ion Batteries; 9 pages; Advanced Energy Materials. 9 (2019) 1900323.

C Lu, Z Li, L Yu, L Zhang, Z Xia, T Jiang, et al., Nanostructured $Bi_2S_3$ encapsulated within three-dimensional N-doped graphene as active and flexible anodes for sodium-ion batteries; 14 pages; Nano Research. 11 (2018) 4614-4626.

Dahbi M, Yabuuchi N, Kubota K, Tokiwa K, Komaba S. Negative electrodes for na-ion batteries 23 pages;. *Physical chemistry chemical physics.* 2014; 16(29):15007-15028.

Metrot A, Guerard D, Billaud D, Herold A. New results about the sodium-graphite system. 9 pages; *Synth Met.* 1980;1(4):363-369.

Lapteva L, Fedoseeva YV, Shlyakhova E, Makarova A, Bulusheva L, Okotrub A. NEXAFS spectroscopy study of lithium interaction with nitrogen incorporated in porous graphitic material. *J Mater Sci.* 2019;54(16):11168-11178.

Lu Y, Huang Y, Zhang M, Chen Y. Nitrogen-doped graphene materials for supercapacitor applications. 11 pages;. *Journal of nanoscience and nanotechnology.* 2014;14(2):1134-1144.

J Cai, Q Sun, X Meng, Novel nanostructured materials by atomic and molecular layer deposition; 43 pages; Materials Science 5(5); 957-999; (2018).

S Lu, W Hu, J Hou, L Liu, J Li, C.J. Harris, C.Y. Lao et al., Phase boundary engineering of metal-organic-framework-derived carbonaceous nickel selenides for sodium-ion batteries; 10 pages; Nano Research. 13 (2020) 2289-2298.

Shembel E, Apostolova R, Strizhko A, Belosokhov A, Naumenko A, Rozhkov V. Problems of corrosion and other electrochemical side processes in lithium chemical power sources with non-aqueous electrolytes. 4 pages; *J Power Sources.* 1995;54(2):421-424.

H Tian, Y Liang, J Repac, S Zhang, C Luo, S Liou, et al., Rational Design of Core-Shell—Structured Particles by a One-Step and Template-Free Process for High-Performance Lithium/Sodium-Ion Batteries, 9 pages; The Journal of Physical Chemistry C. 122 (2018) 22232-22240.

Ellabban O, Abu-Rub H, Blaabjerg F. Renewable energy resources: Current status, future prospects and their enabling technology. *Renewable and Sustainable Energy Reviews.* 2014;39:748-764.

Yabuuchi N, Kubota K, Dahbi M, Komaba S. Research development on sodium-ion batteries. 47 pages; *Chem Rev.* 2014;114(23):11636-11682.

Li M, Carter R, Oakes L, Douglas A, Muralidharan N, Pint CL. Role of carbon defects in the reversible alloying states of red phosphorus composite anodes for efficient sodium ion batteries. 7 pages; *Journal of Materials Chemistry A.* 2017;5(11):5266-5272.

Panwar N, Kaushik S, Kothari S. Role of renewable energy sources in environmental protection: A review. 12 pages; *Renewable and Sustainable Energy Reviews.* 2011;15(3):1513-1524.

I Bauer, M Kohl, H Althues, S Kaskel, Shuttle suppression in room temperature sodium-sulfur batteries using ion selective polymer membranes, 3 pages; Chemical Communications. 50 (2014) 3208-3210.

Xiong X, Yang C, Wang G, et al. SnS nanoparticles electrostatically anchored on three-dimensional N-doped graphene as an active and durable anode for sodium-ion batteries. 7 pages; *Energy & Environmental Science.* 2017;10(8):1757-1763.

MD Slater, D Kim, E Lee, CS Johnson, Sodium-Ion Batteries; 12 pages; Advanced Functional Materials. 23 (2013) 947-958.

Finley M. BP statistical review of world energy. 68 pages; bp.com/statisticalreview. 2020.

P Moreau, D Guyomard, J Gaubicher, F Boucher, Structure and Stability of Sodium Intercalated Phases in Olivine $FePO_4$; 3 pages; Chemistry of Materials. 22 (2010) 4126-4128.

H Gao, J Cai, G Xu, L Li, Y Ren, X Meng, et al., Surface Modification for Suppressing Interfacial Parasitic Reactions of a Nickel-Rich Lithium-Ion Cathode; 8 pages; Chemistry of Materials. 31 (2019) 2723-2730.

Ming J, Ming H, Kwak W, Shin C, Zheng J, Sun Y. The binder effect on an oxide-based anode in lithium and sodium-ion battery applications: The fastest way to ultrahigh performance. 4 pages; *Chemical Communications.* 2014;50(87):13307-13310.

Wuensch BJ, Buerger M. The crystal structure of chalcocite, $Cu_2S$. 7 pages; *Mineral Soc Am Spec Paper.* 1963;1:164-170.

Kim J, Kim D, Cho G, et al. The electrochemical properties of copper sulfide as cathode material for rechargeable sodium cell at room temperature. *J Power Sources.* 2009;189(1):864-868.

D Stevens, J Dahn, the mechanisms of Lithium and Sodium Insertion in Carbon Materials; 10 pages; J.Electrochem.Soc. 148 (2001) A803-A811.

Zhang Y, Guo L, Yang S. Three-dimensional spider-web architecture assembled from $Na_2Ti_3O_7$ nanotubes as a high performance anode for a sodium-ion battery. 4 pages; *Chemical Communications.* 2014;50(90):14029-14032.

X Zhou, J Bao, Z Dai, Y Guo, Tin Nanoparticles Impregnated in Nitrogen-Doped Graphene for Lithium-Ion Battery Anodes; 7 pages; The Journal of Physical Chemistry C. 117 (2013) 25367-25373.

Deng X, Chen Z, Cao Y. Transition metal oxides based on conversion reaction for sodium-ion battery anodes; 20 pages;. *Materials today chemistry.* 2018;9:114-132.

Y An, Z Zhang, H Fei, S Xiong, B Ji, J Feng, Ultrafine $TiO_2$ Confined in Porous-Nitrogen-Doped Carbon from Metal-Organic Frameworks for High-Performance Lithium Sulfur Batteries; 8 pages; ACS applied materials & interfaces. 9 (2017) 12400-12407.

M Hu, H Zhou, X Gan, L Yang, Z Huang, D Wang, et al., Ultrahigh rate sodium ion storage with nitrogendoped expanded graphite oxide in ether-based electrolyte; 8 pages; Journal of Materials Chemistry A. 6 (2018) 1582-1589.

Liu Y, Zhang N, Jiao L, Tao Z, Chen J. Ultrasmall sn nanoparticles embedded in carbon as High-Performance anode for Sodium-Ion batteries. 7 pages; *Advanced Functional Materials.* 2015;25(2):214-220.

Park H, Kwon J, Choi H, Shin D, Song T, Lou XWD. Unusual na ion intercalation/deintercalation in metal-rich Cu1. 8S for na-ion batteries. 11 pages; *ACS nano.* 2018;12(3):2827-2837.

B Jache, P Adelhelm, Use of Graphite as a Highly Reversible Electrode with Superior Cycle Life for Sodium-Ion Batteries by Making Use of Co-Intercalation Phenomena; 5 pages; Angewandte Chemie International Edition. 53 (2014) 10169-10173.

Ong SP, Chevrier VL, Hautier G, et al. Voltage, stability and diffusion barrier differences between sodium-ion and lithium-ion intercalation materials. 29 pages; *Energy & Environmental Science.* 2011;4(9):3680-3688.

\* cited by examiner

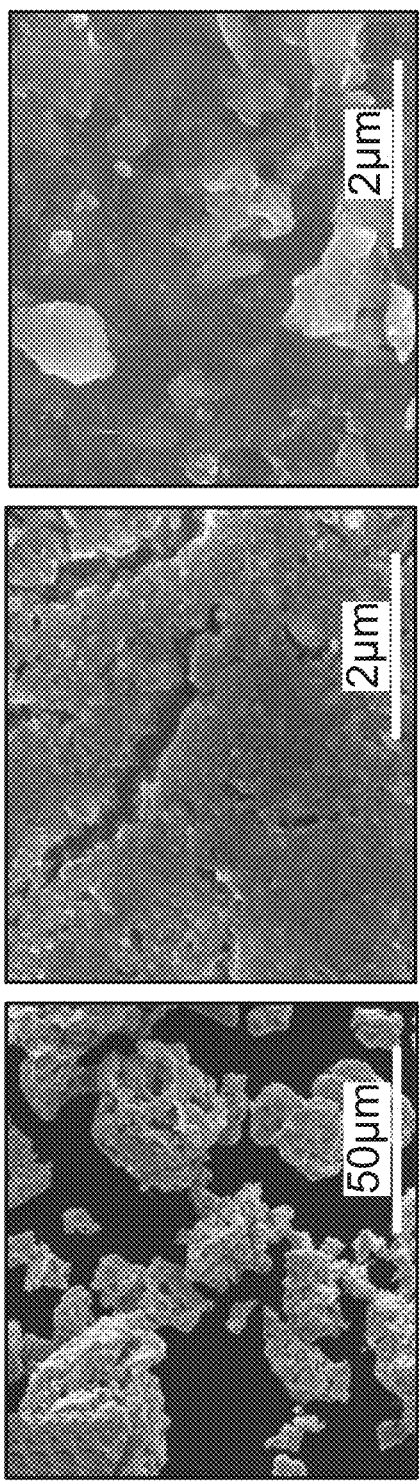

CU$_2$S-BASED SUPERIOR ANODE FOR SODIUM-ION BATTERIES

RELATED APPLICATIONS

This application claims priority to U.S. Provisional Application No. 62/964,530 filed Jan. 22, 2020, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

There has been an ever-increasing demand on renewable clean energies (e.g., solar energy and wind energy) given that fossil fuels (i.e., petroleum, coal, and natural gas) are quickly depleting and causing severe environmental issues. However, these renewable clean energies can only operate intermittently, and their wide implementation needs electrical energy storage (EES) systems.

In this regard, sodium-ion batteries (SIBs), as an alternative technology to lithium-ion batteries (LIBs), are very promising to constitute large-scale EES devices for sustaining smart grids, due to the low cost and natural abundance of sodium. A challenge in SIBs lies in developing high-performance anodes, enabling high capacity, high-rate capability, and long-term cyclability.

Studies on sodium energy storage systems started before the 1980s, almost at the same time that lithium storage systems were developed. SIBs have an electrochemistry similar to LIBs. Although SIB cathodes (e.g., NaMnO$_2$ and NaFePO$_4$) have been developed successfully, SIB anodes were not satisfactory. Compared to Li-ions having a radius of 0.76 Å, Na-ions have a larger radius of 1.02 Å. This has made some LIB intercalation-based anodes not suitable for SIBs. For instance, fewer Na-ions can be intercalated into graphite, which is a widely commercialized LIB anode and enables a theoretical capacity of 372 mAh·g$^{-1}$ for lithium storage via intercalation. Hard carbon is a SIB anode capable of a reversible capacity of >300 math g$^{-1}$. Subsequently, other SIB anodes have been developed, which can be categorized into three classes in terms of their electrochemistry: intercalation (de-intercalation)—(e.g., reduced graphene oxide, TiO$_2$, and Na$_2$Ti$_3$O$_7$), alloy (de-alloy) (e.g., Sn, red P, and Ge), and conversion (e.g., CuO and SnS). Among potential SIB anodes, conversion-based materials, such as metal oxides and metal sulfides, enable high specific capacity and cost-effectiveness. For example, copper(I) sulfide (Cu$_2$S) is a promising conversion material, having a large theoretical capacity of 337 mAh·g$^{-1}$ and low conversion potential of ~0.4 V vs Na/Na$^+$. In addition, Cu$_2$S below 104° C. (called as low-chalcocite) has the crystal structure of hexagonal close-packing lattice structure with Cu—S bond length of 2.18 Å. The large Cu—S bond length may facilitate the fast diffusion for Na-ions.

Previously some studies have been conducted for investigating Cu$_2$S as anodes in SIBs and examined the electrochemical behavior of a commercial micro-sized Cu$_2$S in SIBs. The large micro-sized Cu$_2$S powders were ball-milled to reduce their sizes and then mixed with SuperP conductive carbon and polyethylene oxide (PEO, a binder) in a 6:2:2 weight ratio. The micro-Cu$_2$S electrodes used Al foil as their current collectors and the fabricated electrodes were electrochemically evaluated in a voltage range of 0.4-2.6 V using the electrolyte of 1M NaCF$_3$SO$_3$ in tetra ethylene glycol dimethyl ether (TEGDME) solvent, but could only realize a low capacity of 200 mAh·g$^{-1}$ after 20 cycles at a current density of 50 mA·g$^{-1}$. Subsequently, a few more studies have improved the performance of Cu$_2$S electrodes using different strategies. Cu$_2$S electrodes have also been prepared by manually mixing a commercial micro-sized Cu$_2$S powder with SuperP and polyvinylidene difluoride (PVDF, a binder) in an 8:1:1 weight ratio. The Cu$_2$S electrodes used Cu foil as a current collector. Electrochemical testing was performed in the range of 0.2-2.5 V using the electrolyte of 1M NaPF$_6$ in diethylene glycol dimethyl ether (DEGDME) solvent. The Cu$_2$S electrodes showed dramatically improved stability, accounting for a sustainable discharge capacity of 270 mAh·g$^{-1}$ after 400 cycles and a Coulombic efficiency of ~100% at 1 C (1 C=337 mA·g$^{-1}$). In comparison with DEGDME, a carbonate solvent (i.e., 1:1 ethylene carbonate/diethyl carbonate by volume) remarkably worsened the cycling ability of Cu$_2$S electrodes. A potential reason might be the formation of a protective layer of solid-electrolyte interphase (SEI) when using ether solvents and Na salts. Thus, it is significant to constitute a stable interface between a Cu$_2$S electrode and an ether-based electrolyte. A Cu$_2$S composite was also synthesized using a simple in-situ polymerization process and a subsequent carbonization process, in which Cu$_2$S nanorods were wrapped by N,S co-doped carbon (NSC), i.e., Cu$_2$S@NSC. The received Cu$_2$S@NSC composite was mixed with acetylene black and PVDF in a weight ratio of 70:20:10 for making electrodes on copper foil. Using an electrolyte that 1M NaClO$_4$ was dissolved in 1:1:1 dimethyl carbonate (DMC)/ethylene methyl carbonate (EMC)/ethylene carbonate (EC), it was found that, in the voltage range of 0.01-3.0 V, the Cu$_2$S@NSC composite electrode can only deliver a reversible capacity of 182.3 mAh·g$^{-1}$ after 50 cycles. Encouragingly, another study developed a type of Cu$_2$S micro-sized flakes with small carbon content using an electrochemical process. Mixing the Cu$_2$S flakes with Ketjen black and 1:1 poly(acrylic acid)/carboxyl methyl cellulose in a weight ratio of 7:2:1 in deionized water, the Cu$_2$S electrodes were fabricated and then tested in the electrolyte of 1M NaPF$_6$ dissolved in ethylene glycol dimethyl ether in the voltage range of 0.01-2.5 V. Results showed that the Cu$_2$S electrodes enable a superior rate capability (337 mAh·g$^{-1}$ capacity at 20 A·g$^{-1}$) and ultralong cycle life (88.2% of capacity retention after 5000 cycles at 5 A/g).

In addition to Cu$_2$S, some similar metal sulfides (e.g., Cu$_9$S$_5$ and Cu$_{1.8}$S) have also been investigated in SIBs. Using a one-step thermal treatment, a nanocomposite of Cu$_9$S$_5$/NSC was developed, in which nano-sized Cu$_9$S$_5$ nanoparticles (29 nm in average) were wrapped by amorphous NSC. Thermogravimetric analysis (TGA) showed that there are 64.3 wt % of Cu$_9$S$_5$ in the composite. The Cu$_9$S$_5$@NSC composite was further mixed with SuperP and carboxymethyl cellulose (CMC) binder at a 75:10:15 weight ratio to prepare electrodes on copper foil. Electrochemical measurements showed that the Cu$_9$S$_5$@NSC composite can maintain a reversible charge capacity of 344.3 mAh·g$^{-1}$ after 200 cycles at 100 mA·g$^{-1}$, accounting for an 83.6% retention rate compared to the first charge capacity of 412 mAh·g$^{-1}$. In addition, the composite enabled a capacity of 138.2 mAh·g$^{-1}$ at a high current density of 1600 mA·g$^{-1}$. Another work synthesized a hollow octahedral structure of digenite Cu$_{1.8}$S. The Cu$_{1.8}$S hollow particles as active material were mixed with acetylene black and a binder in a weight ratio of 80:15:5 for fabricating electrodes on Cu foil. Two electrolytes were used, 1 M NaCF$_3$SO$_3$ in EC and DMC, and 1 M NaCF$_3$SO$_3$ in DEGDME. The Na/Cu$_{1.8}$S half cells were cycled at different cutoff voltages (discharge to 0.7/0.5/0.1 V and charge to 1.5/2.2V). It was found that the ether-based DEGDME has good compatibility with Cu$_{1.8}$S. It was also revealed that, in the range of 0.1-2.2 V, the hollow Cu$_{1.8}$S hollow octahedra anode can only sustain 75% of its initial capacity after 50 cycles at 0.2 C. In comparison, the anode performance has been dramatically improved in the ranges of 0.5-2.2 and 0.7-2.2 V, accounting for ~100% Coulombic efficiency. At a current density of 420 mA·g$^{-1}$, a capacity of ~250 mAh·g$^{-1}$ and a superior cyclability over 100% retention were received after 1000 cycles in the range of 0.5-2.2 V. Similarly, a bullet-like Cu$_9$S$_5$ hollow particles coated with nitrogen-doped carbon (NC) have been reported. The resultant Cu$_9$S$_5$@NC composite as active material was mixed with SuperP and CMC in a weight ratio of 70:20:10 for fabricating electrodes. Using 1M NaCF$_3$SO$_3$ in DEGDME as the electrolyte and a voltage range of 0.4-2.6 V, the Cu$_9$S$_5$@NC composite electrode enabled stable cycling performance for a sustainable capacity of ~300 mAh·g$^{-1}$ over 500 cycles at 0.3 A·g$^{-1}$, and a capacity retention of 79% after 4000 cycles at 2 A·g$^{-1}$. In another work, a hyperbranched polymer was used as a template and electrode additive for constructing hierarchical Cu$_9$S$_5$ nanoplates. The resultant Cu$_9$S$_5$ composite was mixed with SuperP and CMC in a weight ratio of 70:20:10 for making electrodes. The electrodes were tested in an electrolyte of 1M in 1:4 dioxlane (DOL)/dimethoethane (DME) by volume in a voltage range of 0.3-3.2 V. The composite electrode enabled high reversible capacity (429 mAh·g$^{-1}$ at 100 mA·g$^{-1}$), high-rate capability (300 mAh·g$^{-1}$ at 20 A·g$^{-1}$), and long-term stability (82.2% capacity retention over 1000 cycles).

BRIEF SUMMARY OF THE INVENTION

In one embodiment, the present invention provides high-performance Cu$_2$S anodes that provide a stable interface between Cu$_2$S anode and electrolyte.

In another embodiment, the present invention provides a ball-milling method to fabricate nanostructured Cu$_2$S wrapped by ultra-thin nitrogen-doped graphene sheets (NGS) for mass production. The resultant Cu$_2$S/NGS composite electrodes exhibited superior rate capability and long-term stable cyclability.

In yet other embodiments of the present invention, NGS is used as both a conductive agent and an encapsulation matrix.

In other embodiments, the present invention provides an electrode that is a composite of Cu$_2$S encapsulated by NGS, i.e. Cu$_2$S/NGS, that achieves a sustainable high capacity of 300 mAh g$^{-1}$ over 500 cycles and operates at high current rates up to 10 C (1 C=337 mA/g).

In other embodiments, the present invention provides an ultrathin metal oxide coating (e.g., Al$_2$O$_3$) via atomic layer deposition (ALD) to the composite to further boost the performance of the Cu$_2$S/NGS electrode.

In yet other aspects, the present invention provides a system and method for making superior Cu$_2$S anodes for sodium-ion batteries. The embodiment is cost-effective and feasible for industrial commercialization.

In yet other embodiments, the present invention provides sodium-ion batteries for energy storage applications such as for portable electronics, electric vehicles, and smart grids.

In another embodiment, the present invention provides an anode material, a current collector, a graphene-based material, and the graphene-based material covers the anode material. In other aspects, the graphene-based material is nitrogen-doped graphene that either partially or fully covers the anode material.

In another embodiment, the graphene-based material includes a plurality of channels that promotes ion transfer.

In another embodiment, the graphene-based material includes a plurality of doping sites made of at least one elemental dopant that form channels that promote ion transfer.

In another embodiment, the graphene-based material includes a plurality of N-doping sites that form channels that promote ion transfer.

In another embodiment, the elemental dopants are N, S, B, and P, or combinations thereof.

In another embodiment, the graphene-based material prevents polysulfide from contacting an electrolyte.

In another embodiment, a metal oxide is coated on the graphene-based material.

In another embodiment, the nitrogen-doped graphene prevents polysulfide from contacting an electrolyte.

In another embodiment, the present invention includes a metal oxide on the nitrogen-doped graphene. In a preferred embodiment, the metal oxide is Al$_2$O$_3$. In yet another preferred embodiment, the nitrogen-doped graphene is in the form of a sheet.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 1A shows an as-received Cu$_2$S powder has a particle size ranging from 10 to 50 μm for an embodiment of the present invention.

FIG. 1B is an SEM image of the electrode made from ball-milled Cu$_2$S and SuperP (indicated as Cu$_2$S/SuperP), showing significantly reduced particles with sizes in the nanoscale for an embodiment of the present invention.

FIG. 1C is an image of an electrode from ball-milled Cu$_2$S and NGS (i.e., Cu$_2$S/NGS), showing reduced particles with sizes mostly less than 2 μm for an embodiment of the present invention.

DETAILED DESCRIPTION OF THE INVENTION

Figure 1D:
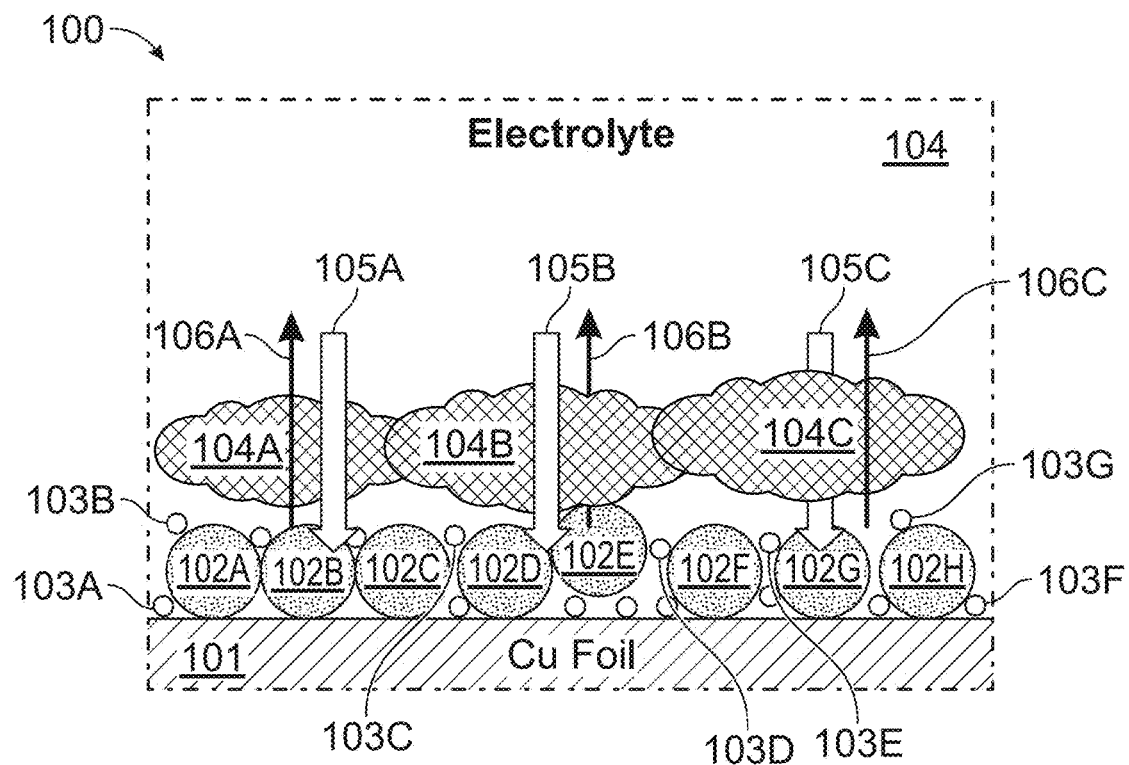
FIG. 1D shows an open-structure Cu₂S@SuperP electrode where Cu₂S particles are exposed to electrolyte for an embodiment of the present invention.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

In a preferred embodiment, the present invention concerns systems and methods for creating anodes for use with sodium-ion batteries. In another preferred embodiment, the present invention provides a method of ball milling to accomplish superior Cu₂S anodes for sodium-ion batteries.

First, ball milling may be used to grind commercial micro-sized Cu₂S powders and mixing the powders with conductive agents and binders. Second, nitrogen-doped graphene (NGS) is used to replace traditional carbon black as conductive additive. This embodiment has multiple benefits such as suppressing formation of solid electrolyte interphase, inhibiting sulfur shuttling, and improving conductivity.

In other embodiments, atomic layer deposition may be used to improve the performance of Cu₂S anodes.

In yet other embodiments, the Cu₂S anodes for sodium-ion batteries (SIBs) may be further improved through coupling with a SIB cathode.

Using a ball-milling method to fabricate nanostructured Cu₂S wrapped by ultra-thin nitrogen-graphene sheets (NGS) produces Cu₂S/NGS composite electrodes that exhibit superior rate capability and long-term stable cyclability in comparison with Cu₂S/SuperP electrodes. Moreover, a uniform and conformal Al₂O₃ coating via atomic layer deposition (ALD) further improves the performance of Cu₂S/NGS electrodes.

In one embodiment, Copper(I) sulfide (Cu₂S) was mixed with a conductive additive (either SuperP or NGS (ACS Material)) and a PVDF binder (MTI Corporation) in 1-Methyl-2-pyrrolidone (NMP, Sigma-Aldrich) solvent in a weight ratio of 8:1:1. The mixtures were then ball-milled at 870 rpm for 6 hours using a planetary system (MSE Supplies LLC.) to grind down the Cu₂S particle size. The resultant slurries were subsequently cast on Cu foil with a thickness of 200 μm by a doctor blade. The electrode films were dried in an ambient environment and were heated at 100° C. in a vacuum for 8 hours. Al₂O₃ coatings were performed using atomic layer deposition (ALD, Savannah 200, Veeco) for different thicknesses at 100° C. The ALD precursors are trimethylaluminum (TMA) and H₂O.

Electrochemical Tests

The electrochemical performance of Cu₂S electrodes made in accordance with the present invention were evaluated in half coin cells (CR2032 stainless steel coin cells), using sodium metal as the counter electrode. Cu₂S electrodes were punched into circular disks with a ⁷⁄₁₆-inch diameter, and the loading of Cu₂S active material is in the range of 1.5-2 mg cm⁻². Celgard polypropylene/polyethylene membranes (25 μm thick, MTI Corporation) were used as separators. Sodium metal (Millipore Sigma) was roll-pressed to sodium foil and then punched into 7/16-inch circular disks as counter electrodes. The liquid electrolyte was 1 M $NaPF_6$ (Sigma-Aldrich) in DEGDME (Sigma-Aldrich). The coin cells were then assembled and pressed under a hand-operated hydraulic crimping machine (MTI Corporation) at 1000 psi within an Ar-filled glove box with $H_2O$ and 02 levels <0.01 ppm.

Galvanostatic cycling tests were performed on a Neware Battery Testing System at room temperature. Cyclic voltammetry (CV) and electrochemical impedance spectroscopy (EIS) were both performed on an SP-200 potentiostat (Biologic). CV applied a scan rate of 0.1 mV $s^{-1}$ in the voltage range of 0.01-3 V vs. $Na/Na^+$. EIS were measured at the frequency range from 0.01 Hz to 100 kHz with an AC signal amplitude of 5 mV.

Characterizations

Materials morphologies were characterized using a scanning electron microscopy (SEM, NanoSEM 450). Elemental mapping of elements was conducted using energy-dispersive X-ray (EDX, NanoSEM 450) analysis. The phase structure and valence state of materials were determined using synchrotron-based X-ray diffraction (XRD, 11 ID-D beamline) and X-ray adsorption spectroscopy (XAS, 20 BM-B beamline) at Advanced Photon Source (APS) at Argonne National Laboratory, respectively. Ex-situ XRD and ex-situ XAS characterizations were performed at the beamlines 11 ID-D (0.1173 Å wavelength) and 20 BM-B (Cu K edge) at APS, respectively.

FIG. 1A shows that the as-received $Cu_2S$ powder has a particle size ranging from 10 to 50 μm. In order to facilitate Na-ion diffusion into $Cu_2S$ lattice during electrochemical cycling, the micro-sized $Cu_2S$ particles were ball-milled at 870 rpm for 6 hrs. FIG. 1B is the SEM image of the electrode made from ball-milled $Cu_2S$ and SuperP (indicated as $Cu_2S$/SuperP), showing significantly reduced particles with sizes in the nanoscale. In comparison, FIG. 1C is the image of the electrode from ball-milled $Cu_2S$ and NGS (i.e., $Cu_2S$/NGS), showing reduced particles with sizes mostly less than 2 μm. The bigger particle sizes in $Cu_2S$/NGS electrodes are believed due to the porous structure of NGS and its high mechanical strength against the particle grinding. It is also noteworthy that the two electrodes have distinct morphologies. As illustrated in FIG. 1B, the $Cu_2S$/SuperP electrode has numerous cracks and voids fully accessible to the electrolyte.

In another aspect, the present invention provides an open-structure $Cu_2S$@SuperP electrode 100 on Cu foil 101 comprised of $Cu_2S$ particles 102A-102H and SuperP particles 103A-103 as shown in FIG. 1D. As shown are SEI 104A-104C, $Na^+$ diffusion 105A-105C and polysulfide shuffling 106A-106C.

Figure 1E:
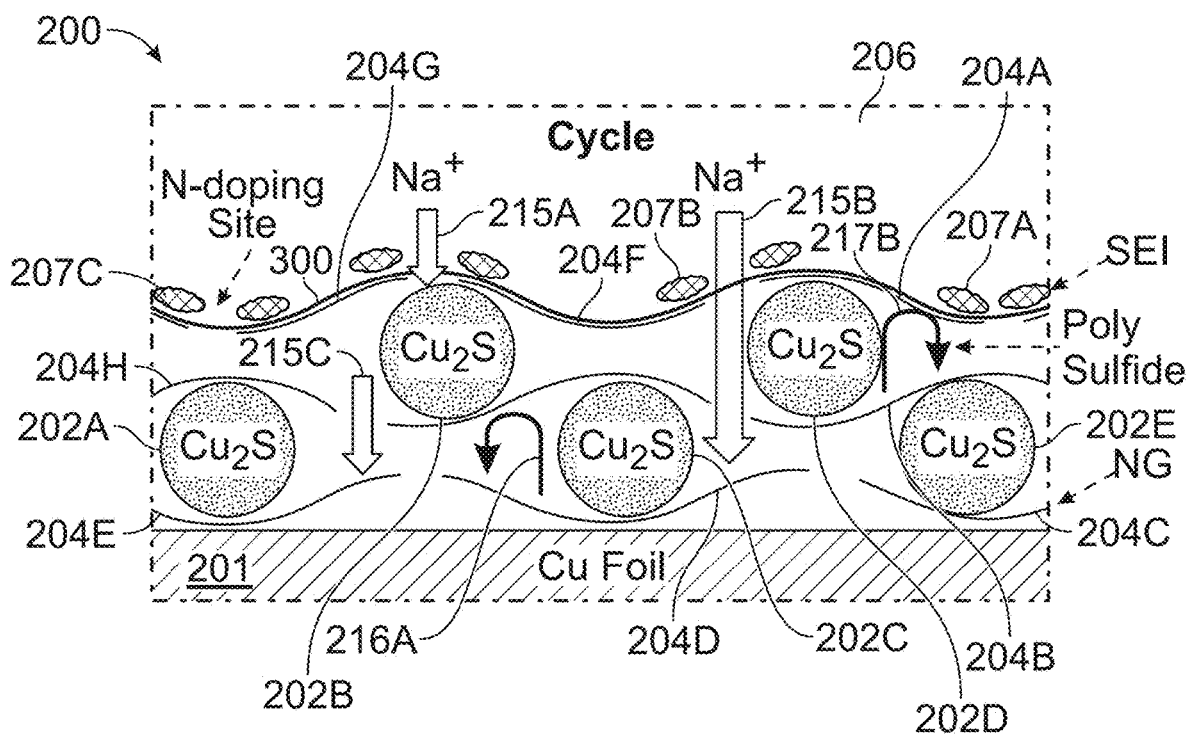
FIG. 1E shows a close-structure Cu₂S@NG electrode where Cu₂S particles are encapsulated by NG and isolated from the direct contact with electrolyte for an embodiment of the present invention.

In comparison, FIG. 1E shows a close-structure anode comprising an anode material which may be $Cu_2S$ particles 202A-202E. Also provide is a current collector 201 which may be a copper foil. The embodiment further includes a graphene-based material 204A-204H. The graphene-based material covers the anode material.

In other aspects, the graphene-based material either partially or fully covers the anode material. In another embodiment, the graphene-based material prevents polysulfide from contacting electrolyte 206.

In yet other embodiments, the graphene-based material includes a plurality of channels that promotes ion transfer. In another embodiment, the graphene-based material includes a plurality of doping sites made of at least one elemental dopant that forms channels that promote ion transfer. The elemental dopants may be N, S, B, and P, or combinations thereof. FIG. 1E also shows SEI 207A-207C, $Na^+$ diffusion 215A-21C and polysulfide shuffling 216A-216B.

Figure 2A:
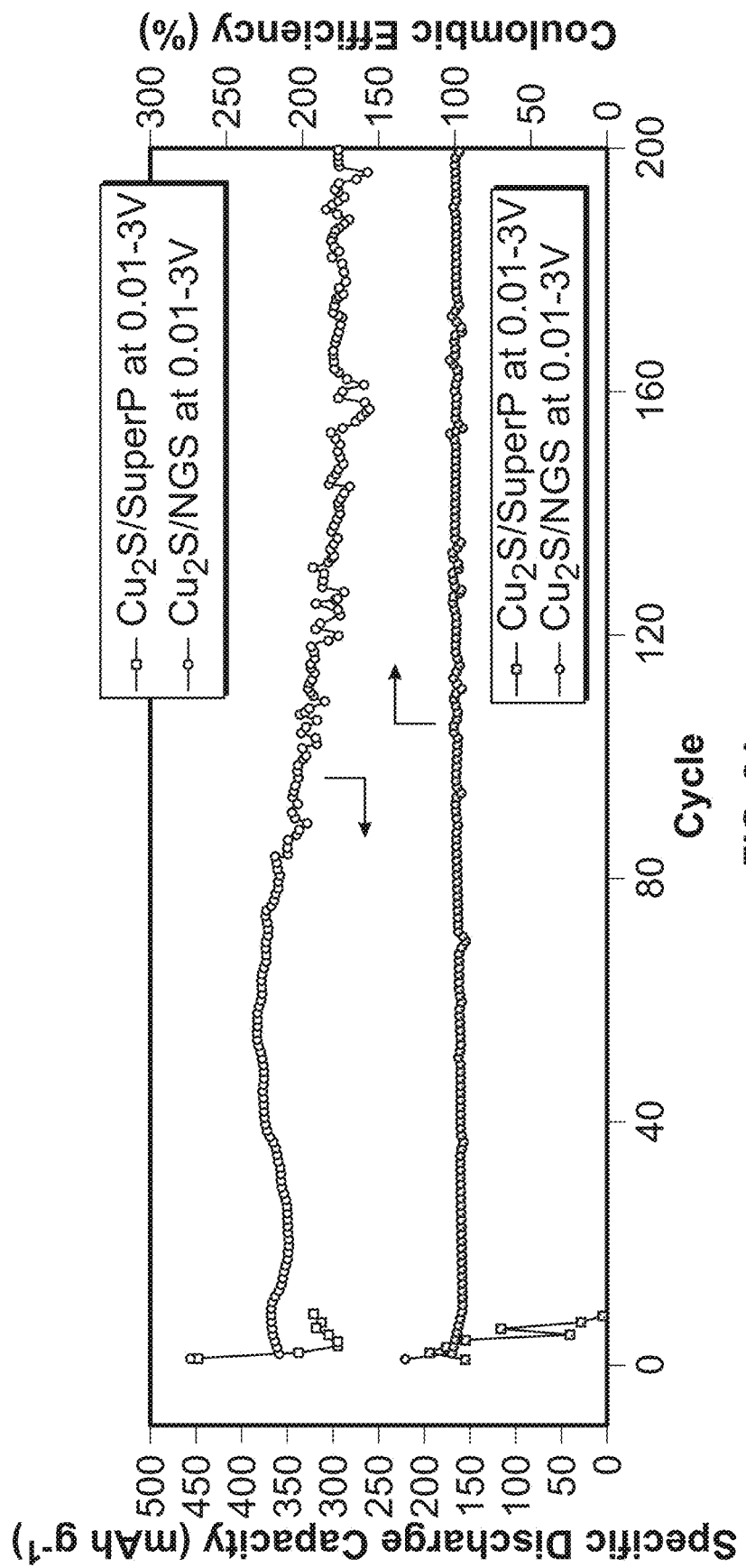
FIG. 2A show a specific discharge capacity and Coulombic efficiency vs. cycles of Cu₂S/SuperP and Cu₂S/NGS electrodes in Na half cells tested under 0.01-3 V at a rate of 100 mA·g⁻¹.

The electrochemical behaviors of $Cu_2S$/SuperP and $Cu_2S$/NGS electrodes were comparatively investigated. FIG. 2A shows the cyclability and Coulombic efficiency (CE) of the electrodes at a current density of 100 mA $g^{-1}$ in the voltage range of 0.01-3 V. The $Cu_2S$/SuperP electrode faded in capacity and CE quickly in 10 cycles. CE here is the ratio of discharge capacity over charge capacity. The low CE (<50%) and the almost unchanged discharge capacity (~300 mAh $g^{-1}$) for $Cu_2S$/SuperP electrode after 3 cycles reveal that there has an abnormally long charging phenomenon. This might have been caused by a polysulfide shuttling effect, as reported in Na—S batteries. In comparison, $Cu_2S$/NGS electrode delivered an initial discharge capacity of ~450 mAh $g^{-1}$ and then >300 mAh $g^{-1}$ in 200 cycles with CE of 99%. Thus, the $Cu_2S$/NGS electrode has improved performance electrochemically in cyclability, efficiency, and sustainable high capacity. This also suggests that NGS replacing SuperP inhibits the polysulfide shuttling issue through isolating $Cu_2S$ from direct contact with the electrolyte as shown in FIG. 1E. NGS is a physical barrier that reduces or inhibits S shuttling. The gradually fading capacity of $Cu_2S$/NGS after 80 cycles might be due to the reconstruction of $Cu_2S$/NGS during electrochemical cycling.

Figure 2B:
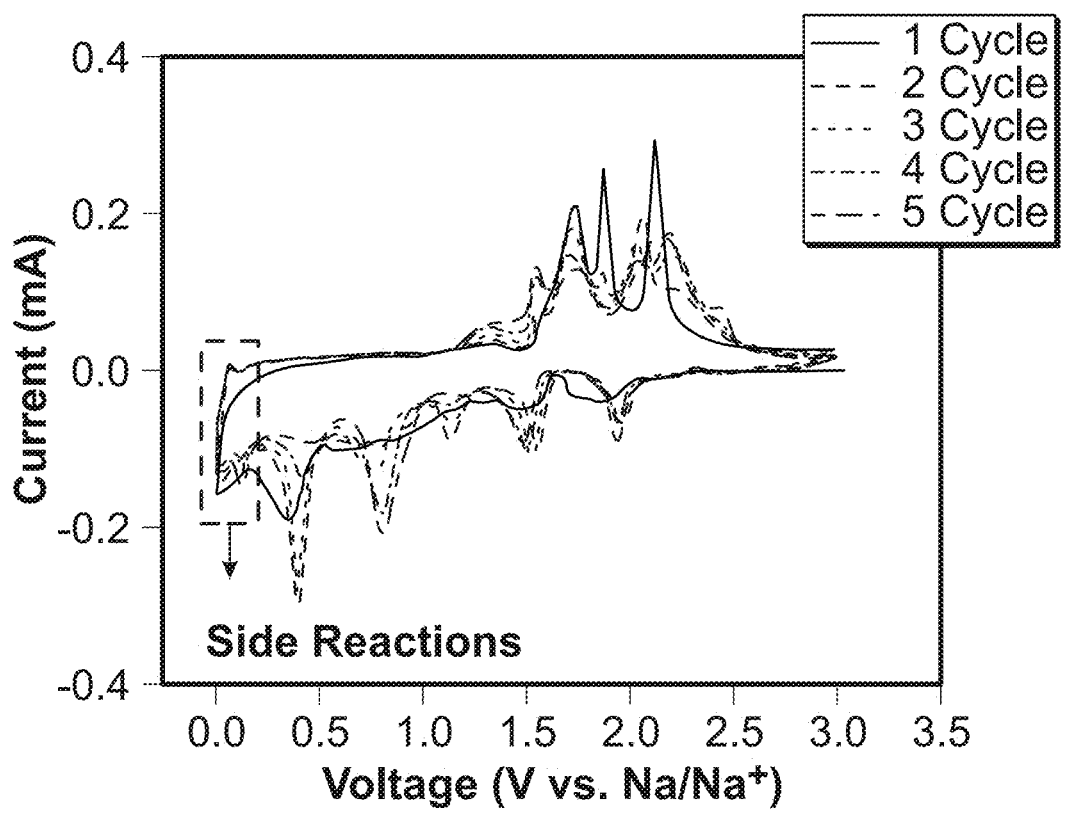
FIG. 2B shows cyclic voltammetric profiles of a 5-cycle Na—Cu₂S/SuperP cell
Figure 2C:
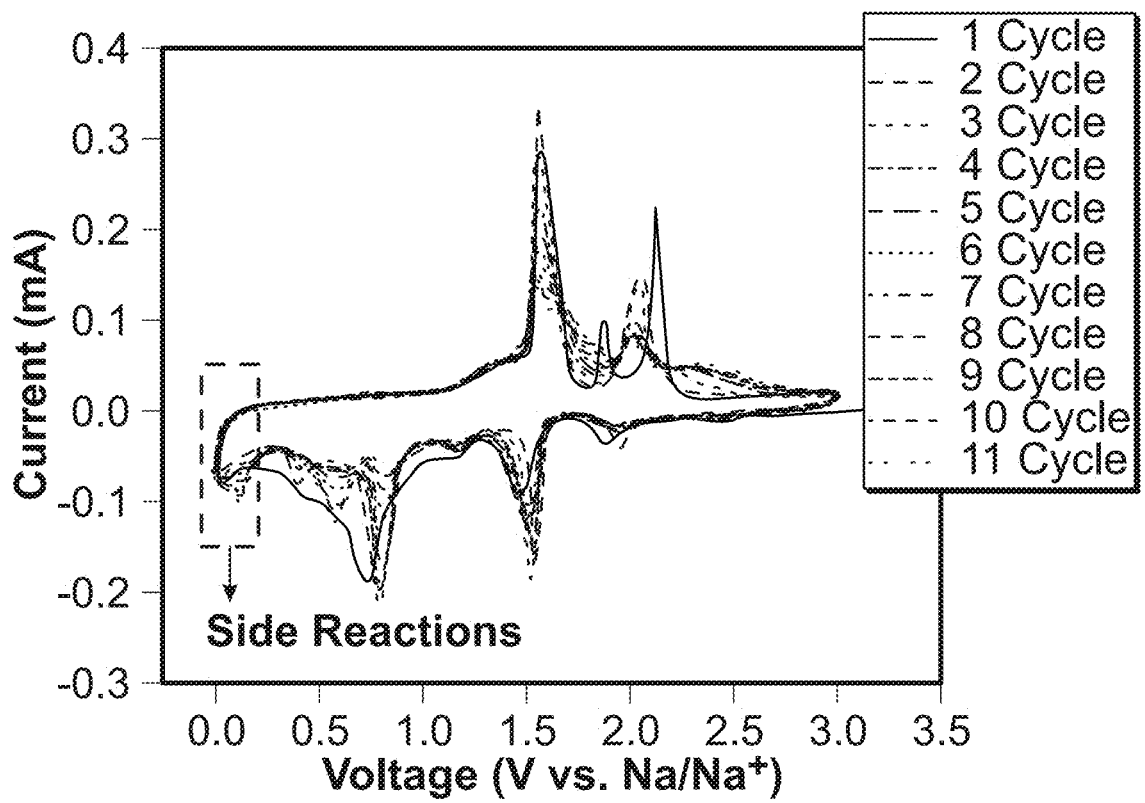
FIG. 2C shows cyclic voltammetric profiles of an 11-cycle Na—Cu₂S/NGS cell.

The CV profiles are shown in FIGS. 2B and 2C for the $Cu_2S$/SuperP and $Cu_2S$/NGS electrode, respectively. In the first discharge, both the electrodes show five reduction peaks at 0.41, 0.80, 1.16, 1.50, and 1.89 V commonly, ascribed to $Cu_2S$ intercalation and conversion reactions. Two additional reduction peaks at low potentials of 0.13 and 0.01 V might be the side reactions between the electrodes and the electrolyte with the formation of solid electrolyte interphase (SEI). In the first charge, there are three common oxidation peaks at 1.59, 1.88, and 2.13 V for the two electrodes. After the first cycle, both electrodes underwent some distinct evolutions at each peak, indicating that electrochemical behaviors of the two electrodes are dynamically changing. In addition, regarding the polysulfide shutting issue in $Cu_2S$/SuperP electrode after 3 cycles, FIG. 2B shows many side reactions in the charge processes, likely related to polysulfide shuttling. In comparison, FIG. 2C shows fewer reactions during the charge processes.

Figure 2D:
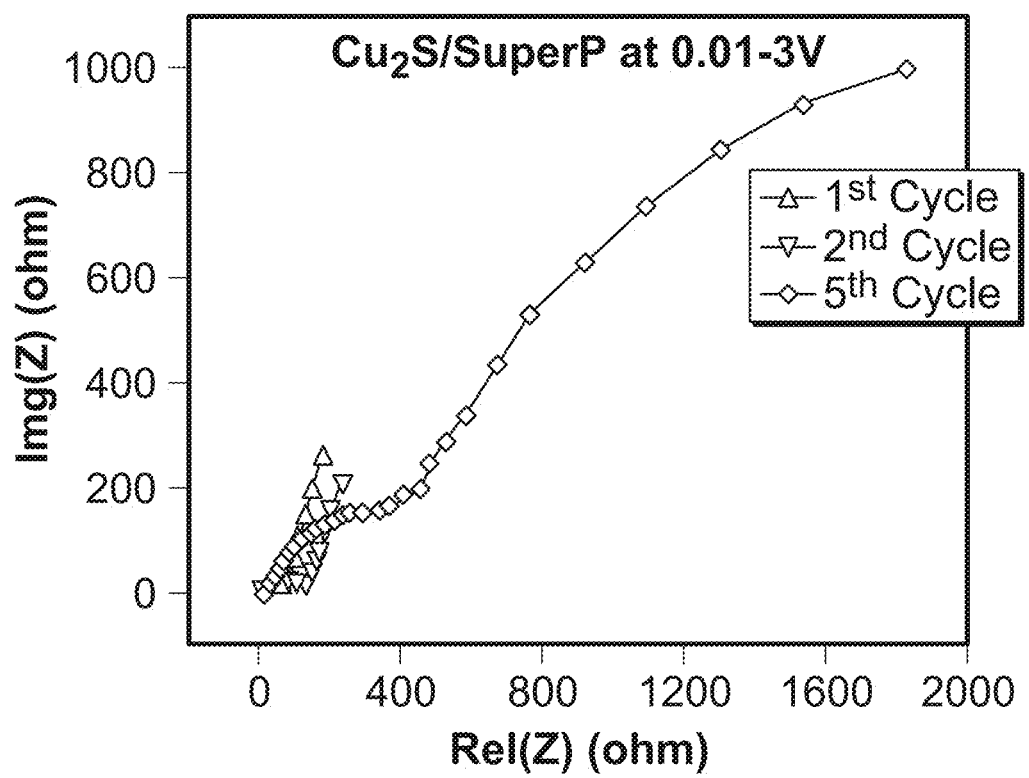
FIG. 2D is a Nyquist plot from EIS measurements of a Na—Cu₂S/SuperP cell during 5 cycles.
Figure 2E:
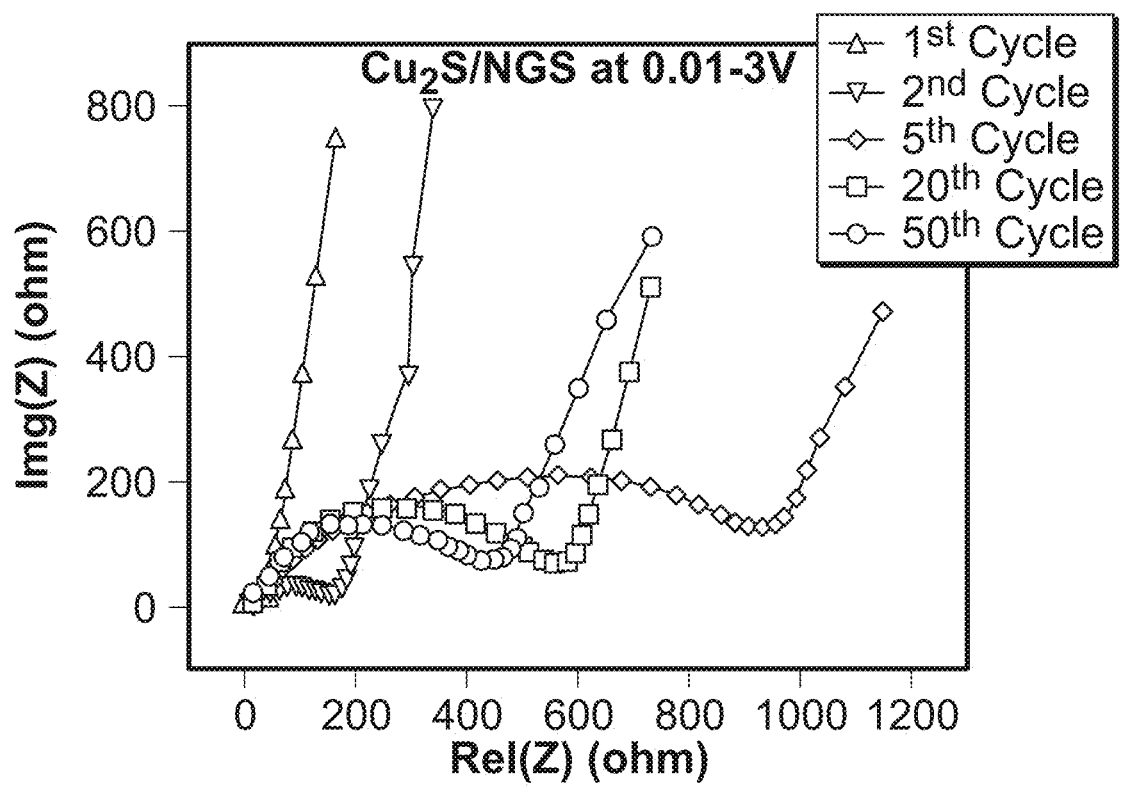
FIG. 2E is a Nyquist plot from EIS measurements and a Na—Cu₂S/NGS cell during 50 cycles.

The electrochemical stability was also investigated via EIS tests, the $Cu_2S$/SuperP cell shows a suddenly increasing impedance at the $5^{th}$ cycle (FIG. 2D), probably due to the unstable SEI formation and the polysulfide shuttling. Similarly, the $Cu_2S$/NGS cell has an increasing impedance in the first 5 cycles (FIG. 2E), probably due to the reconstruction of $Cu_2S$/NGS materials. However, the $Cu_2S$/NGS cell shows a decreasing impedance after 5 cycles, indicating some optimization by the reconstruction.

Figure 3A:
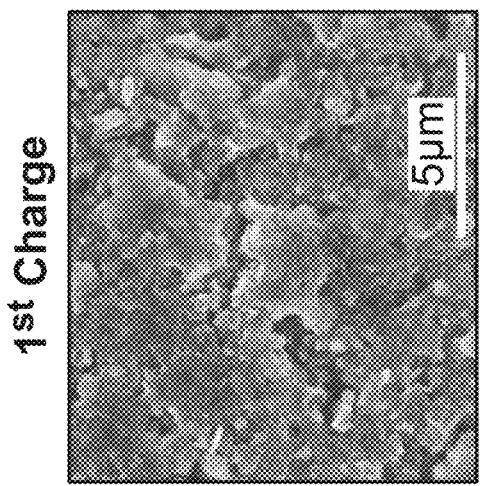
FIG. 3A is an SEM of the morphology of pristine Cu₂S/SuperP.
Figure 3B:
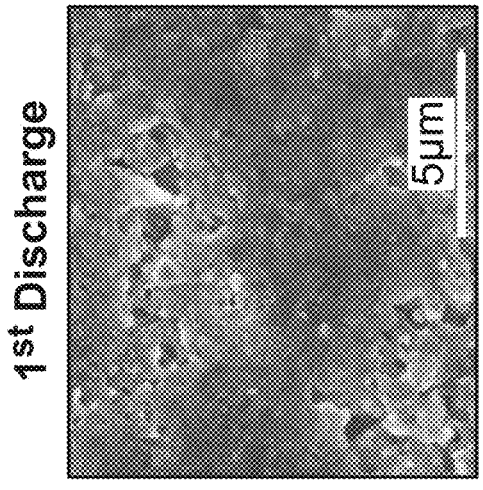
FIG. 3B is an SEM of the morphology of the Cu₂S/SuperP shown in FIG. 3A after 1$^{st}$ discharge.
Figure 3C:
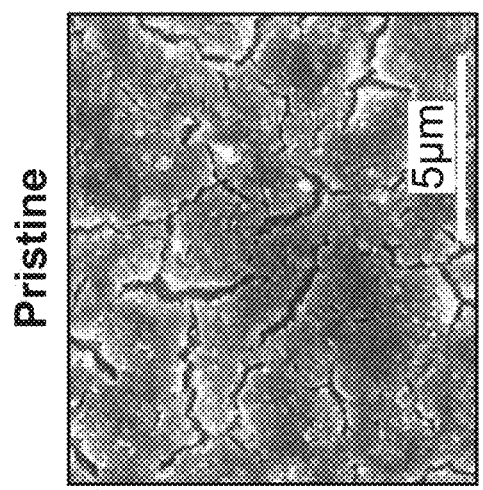
FIG. 3C is an SEM of the morphology of morphology of the Cu₂S/SuperP shown in FIG. 3A after 1$^{st}$ charge.
Figure 3D:
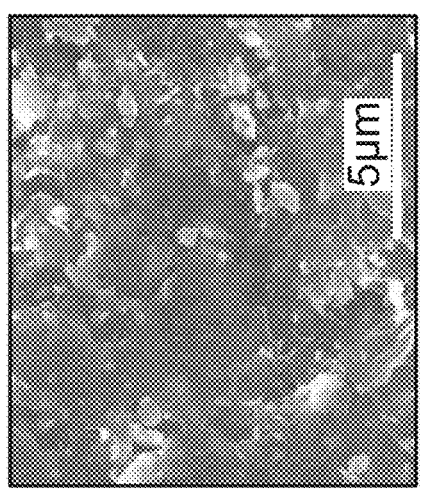
FIG. 3D is an SEM of the morphology of pristine Cu₂S/NGS electrodes.
Figure 3E:
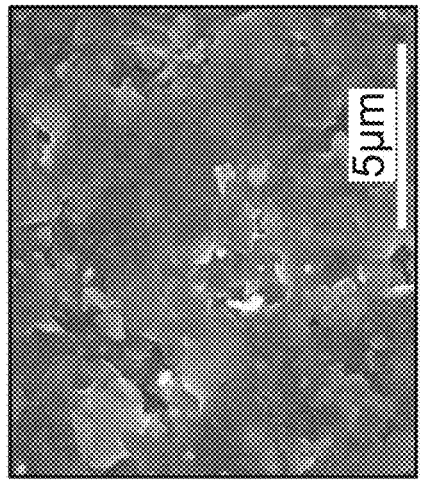
FIG. 3E is an SEM of the morphology of the Cu₂S/NGS electrodes shown in FIG. 3D after 1st discharge.
Figure 3F:
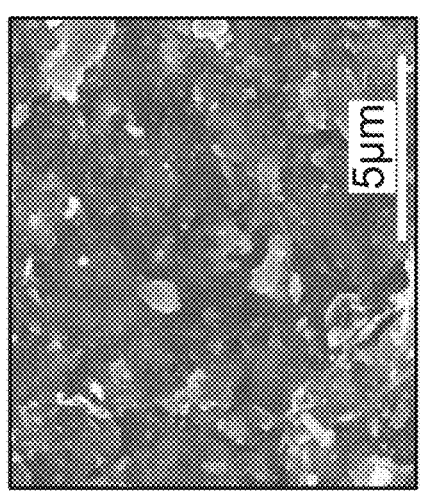
FIG. 3F is an SEM of the morphology of morphology of the Cu₂S/NGS electrodes shown in FIG. 3D after 1st charge.

The morphological changes of the two $Cu_2S$ electrodes during the first cycle were examined using SEM. Compared to the surface of a pristine electrode in FIG. 3A, the surface of $Cu_2S$/SuperP electrode (FIG. 3B) is covered by an additional dense layer after sodiation. This additional layer may be an SEI layer. In contrast, the sodiated $Cu_2S$/NGS electrode (FIG. 3E) has little difference with the pristine electrode (FIG. 3D), implying less SEI formation than that with the $Cu_2S$/SuperP electrode. After desodiation (FIG. 3F), the $Cu_2S$/NGS electrode almost recovers back to its pristine morphology (FIG. 3a), but the $Cu_2S$ particles become smaller. The smaller $Cu_2S$ particles provide direct evidence for the reconstruction of the $Cu_2S$/NGS electrode. In contrast, the desodiated $Cu_2S$/SuperP electrode (FIG. 3C)

becomes more porous, compared to its pristine electrode in FIG. 3A. Compared to FIG. 3B, FIG. 3C implies that the SEI layer is unstable and can cause continuous electrolyte decomposition and increased impedance.

Figure 4A:
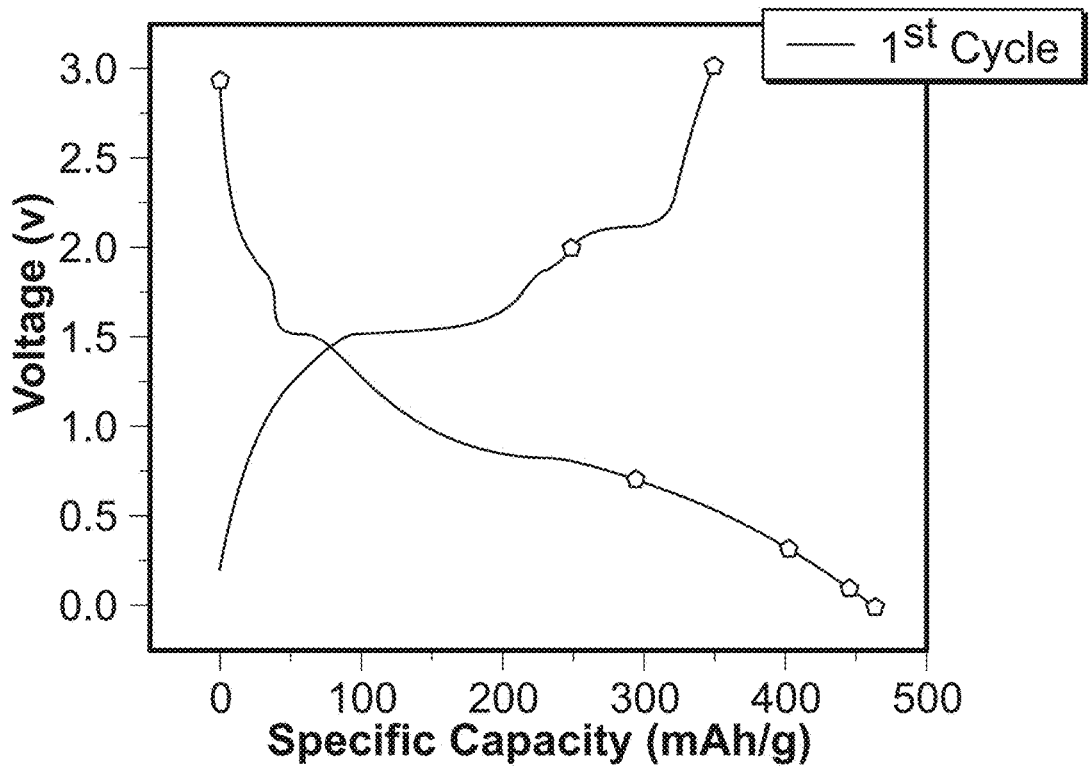
FIG. 4A shows selected voltage plates on galvanostatic profile at 50 mA·g⁻¹ in 0.01-3.0 V for ex-situ XRD tests.
Figure 4B:
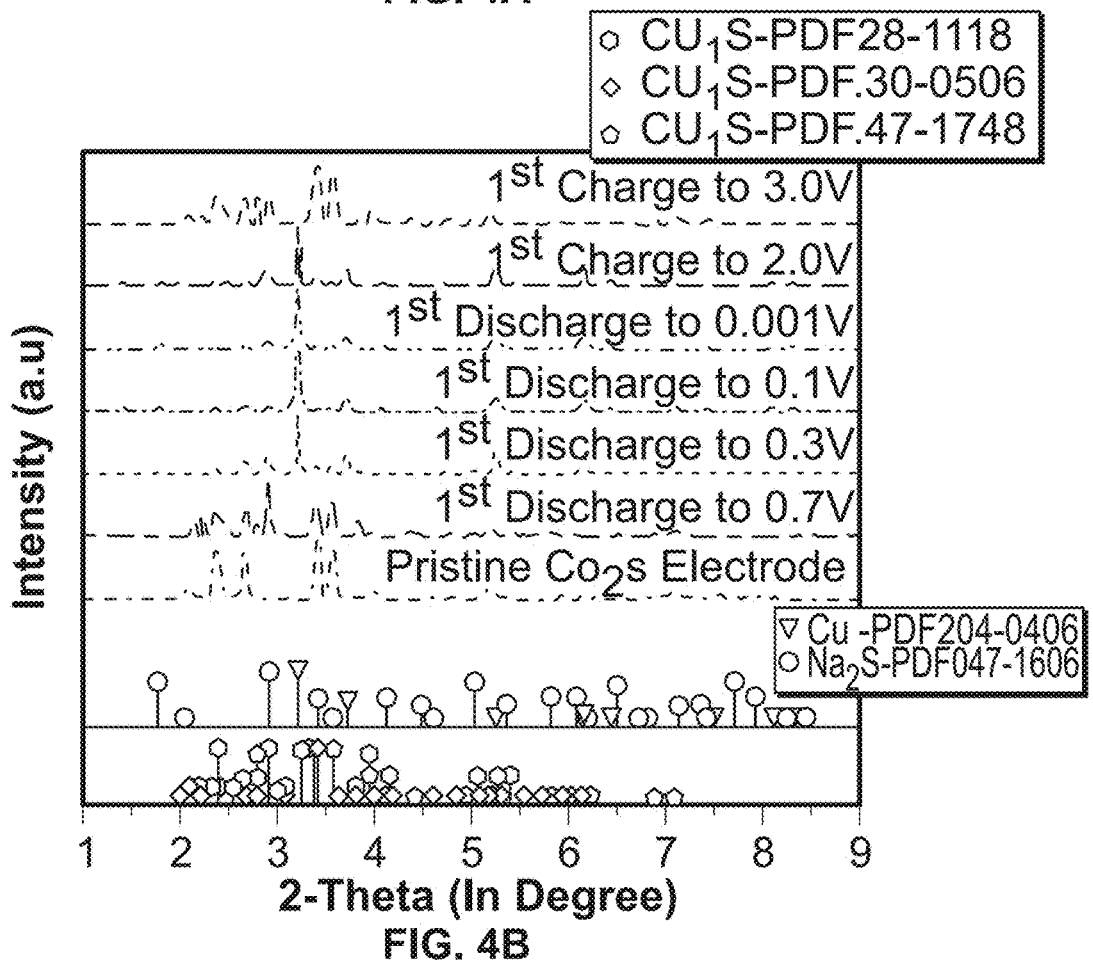
FIG. 4B show ex situ XRD patterns of pristine Cu₂S/NGS electrode and the electrodes after cycling at the potentials of 0.7 V (discharge), 0.3 V (discharge), 0.1 V (discharge), 0.01 V (discharge), 2 V (charge), and 3 V (charge) versus Na/Na⁺.
Figure 4C:
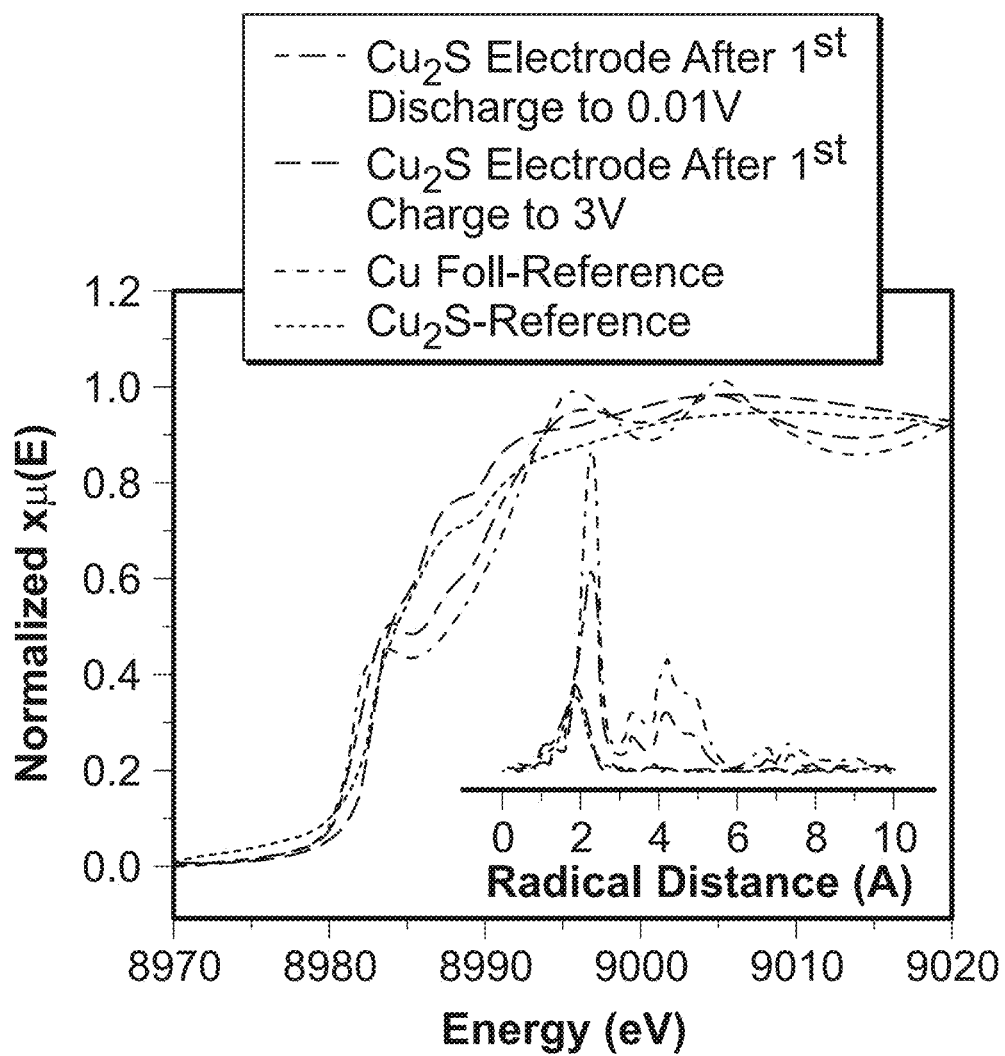
FIG. 4C is a comparison of the normalized Cu K-edge XAS spectra for Cu₂S Cu₂S/NGS electrodes discharged to 0.01V and charged to 3V. The dot-dash lines show the near-edge spectra of Cu and Cu₂S powder as references for Cu and Cu⁺ valency state. The inset shows the radical distance to first neighboring atoms.

FIG. 4A shows the selected voltage for performing ex-situ synchrotron-based XRD analyses, including the voltages of 0.7, 0.3, 0.1, and 0.01 V during the discharge, and 2.0 and 3.0 V during the charge of the first cycle. XRD results in FIG. 4b show that the pristine $Cu_2S$/NGS electrode contains mixed phases of $Cu_2S$, $Cu_{1.8}S$, and $Cu_{1.92}S$. Discharging to 0.7 V, the XRD patterns of $Cu_2S$ phases became left-shifted, suggesting the enlarged volume of $Cu_2S$ lattice by Na intercalation. Discharging to 0.3V, the shifted $Cu_2S$ peaks have diminished in intensity, while simultaneously Cu and $Na_2S$ peaks arise. This indicates that $Cu_2S$ may have experienced a conversion reaction and converted into $Na_2S$ and Cu between 0.7 and 0.3 voltage. Further discharging to 0.1 V, the $Cu_2S$ features nearly have disappeared while Cu and $Na_2S$ peaks become much evident. When fully discharging to 0.01 V, no significant phase changed for Cu and $Na_2S$ patterns in comparison with that at 0.1 V. This may suggest that the electrochemistry of $Cu_2S$ via sodiation may have accomplished above 0.01 V. On the other hand, the desodiated electrode at 2.0 V showed two major Cu and $Na_2S$ patterns while some minor $Cu_xS$ patterns. As desodation to 3.0 V, $Cu_2S$ patterns are reversibly recovered and there is no Cu peak found. In addition, synchrotron-based XAS in FIG. 4C confirmed the reversible electrochemistry by tracking the valency state of the Cu element based on its K edge. The electrode discharged to 0.01 V exhibits similar $Cu^0$ valency state and first-neighboring-atom distance to the standard Cu foil, suggesting the complete conversion from $Cu_2S$ to Cu metal. As charging to 3 V, the valency state of Cu recovered to $Cu^{1+}$ with the close first-neighboring-atom distance to pristine $Cu_2S$ powder. Thus, XRD and XAS strongly evidence that Na and $Cu_2S$ undergo a highly reversible electrochemical reactions, including intercalation and conversion.

Figure 5A:
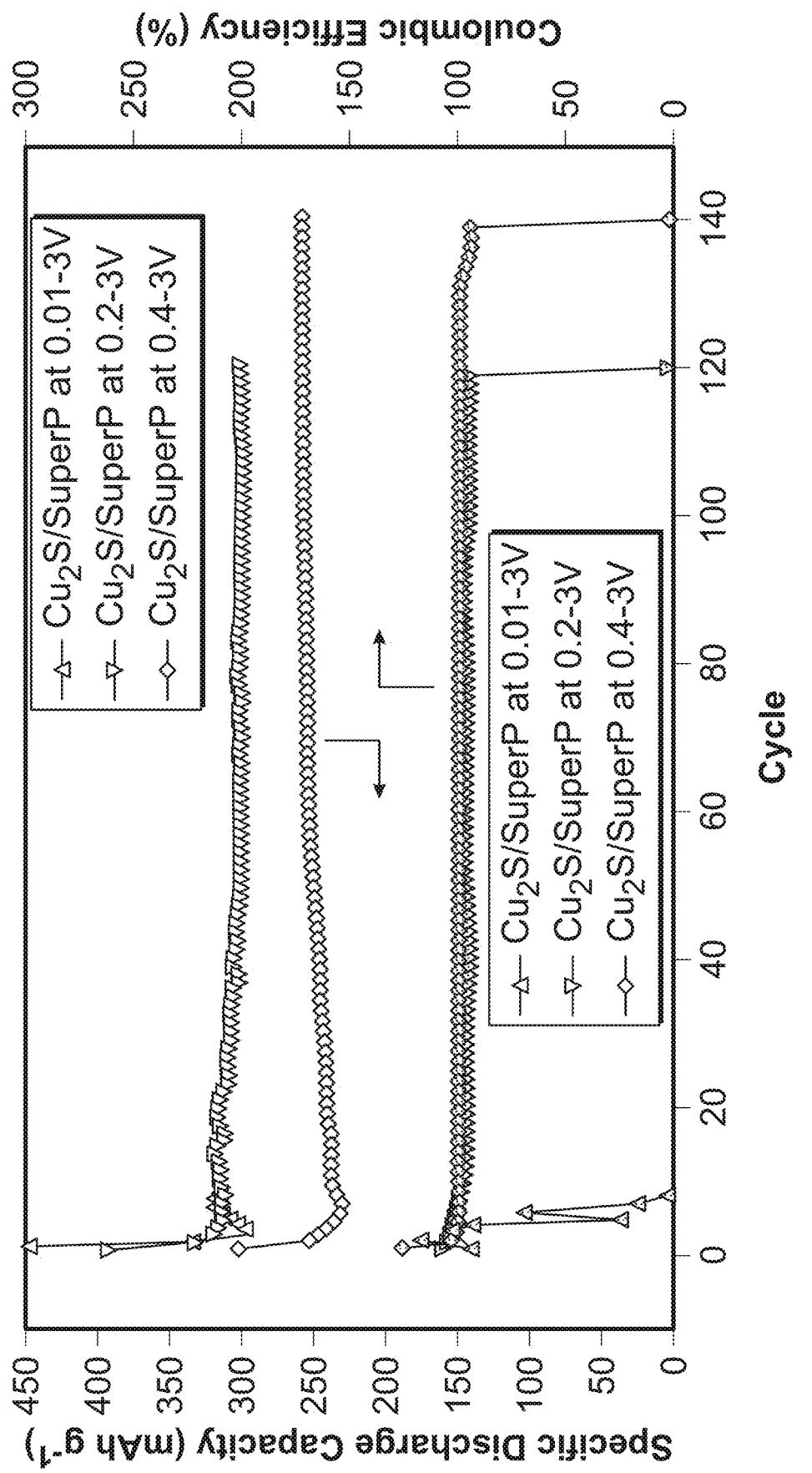
FIGS. 5A, 5B, 5C and 5D are comparisons between Cu₂S/SuperP and Cu₂S/NGS electrodes for (a) (c) cycle performance with cutoff voltages of 0.01, 0.2, 0.4 V versus Na/Na⁺ at 100 mA·g⁻¹ and (b) (d) rate performance with a cutoff voltage of 0.2 V versus Na/Na⁺ at current densities of 100 mA·g⁻¹, 0.5, 1, 2, 5, and 10 C, respectively.
Figure 5B:
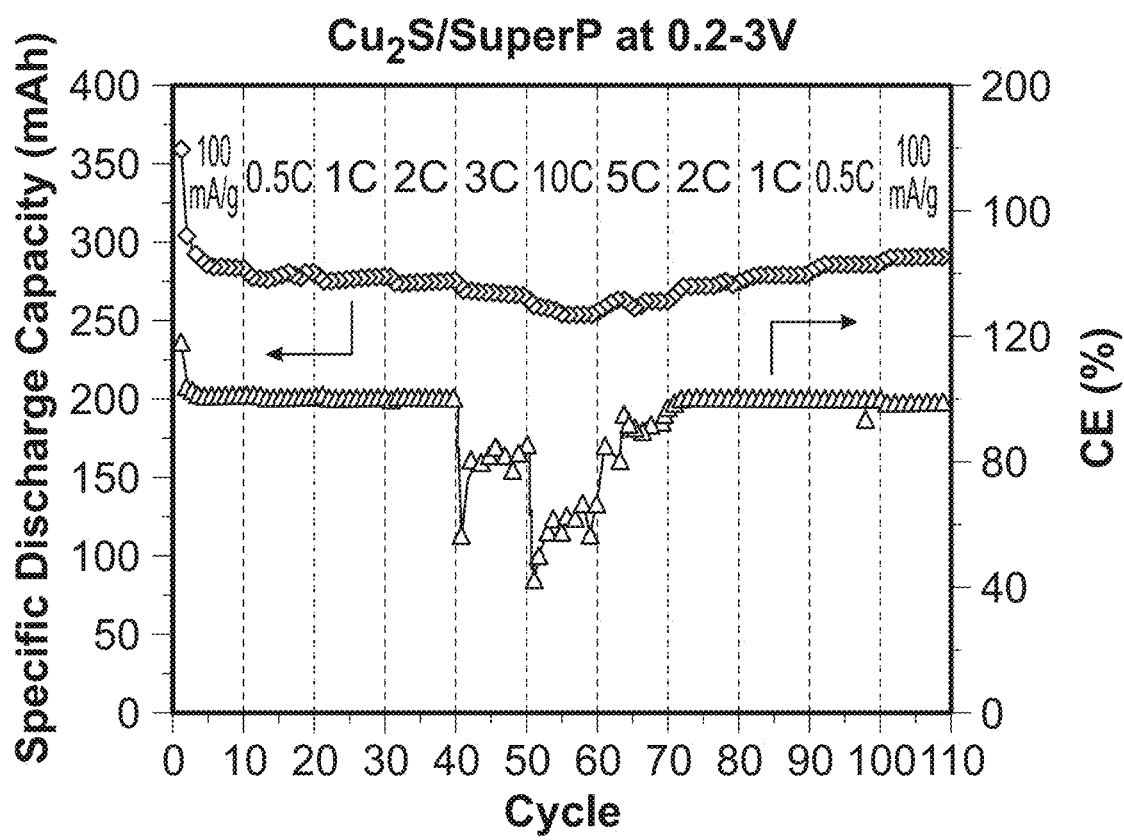
Figure 5C:
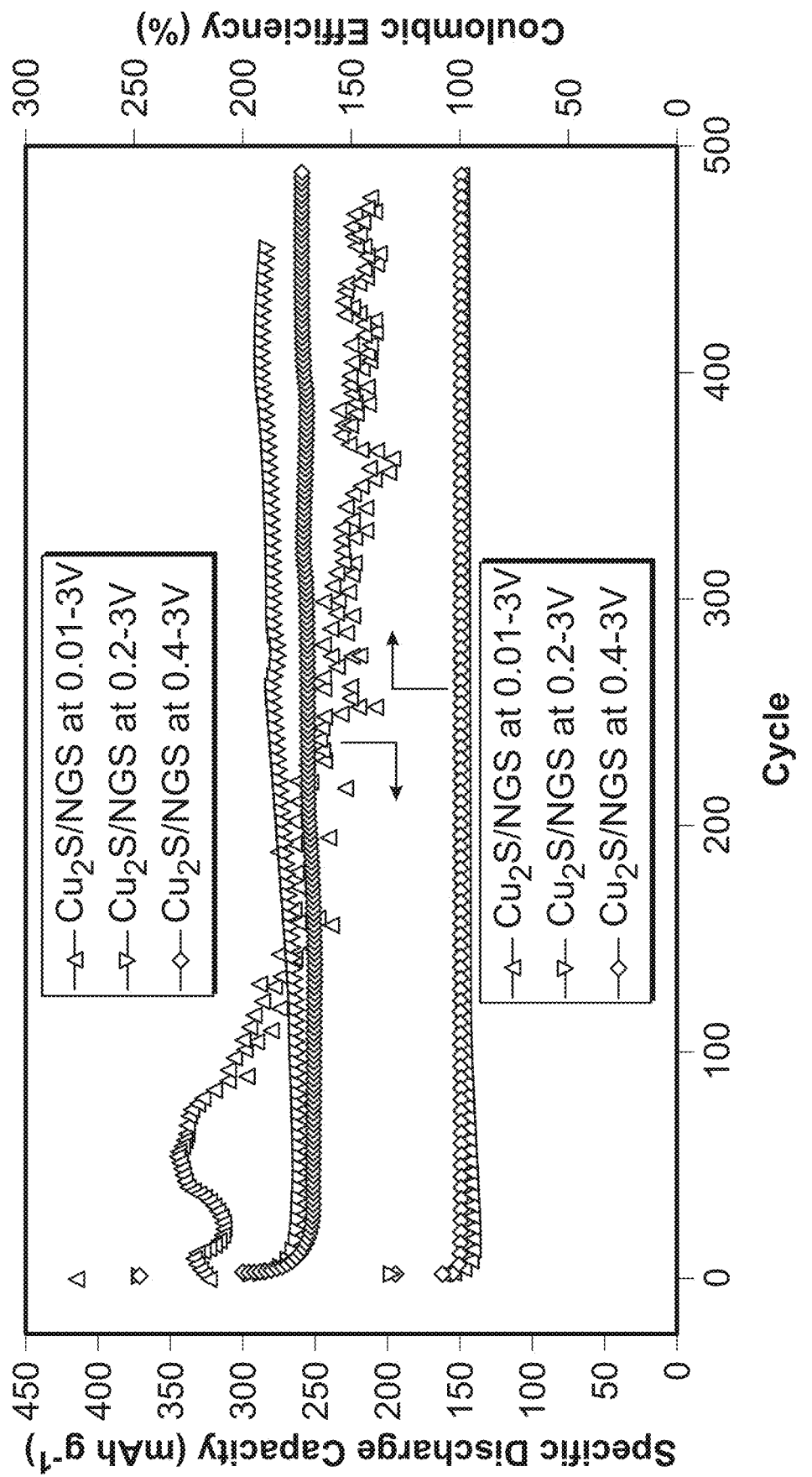
Figure 5D:
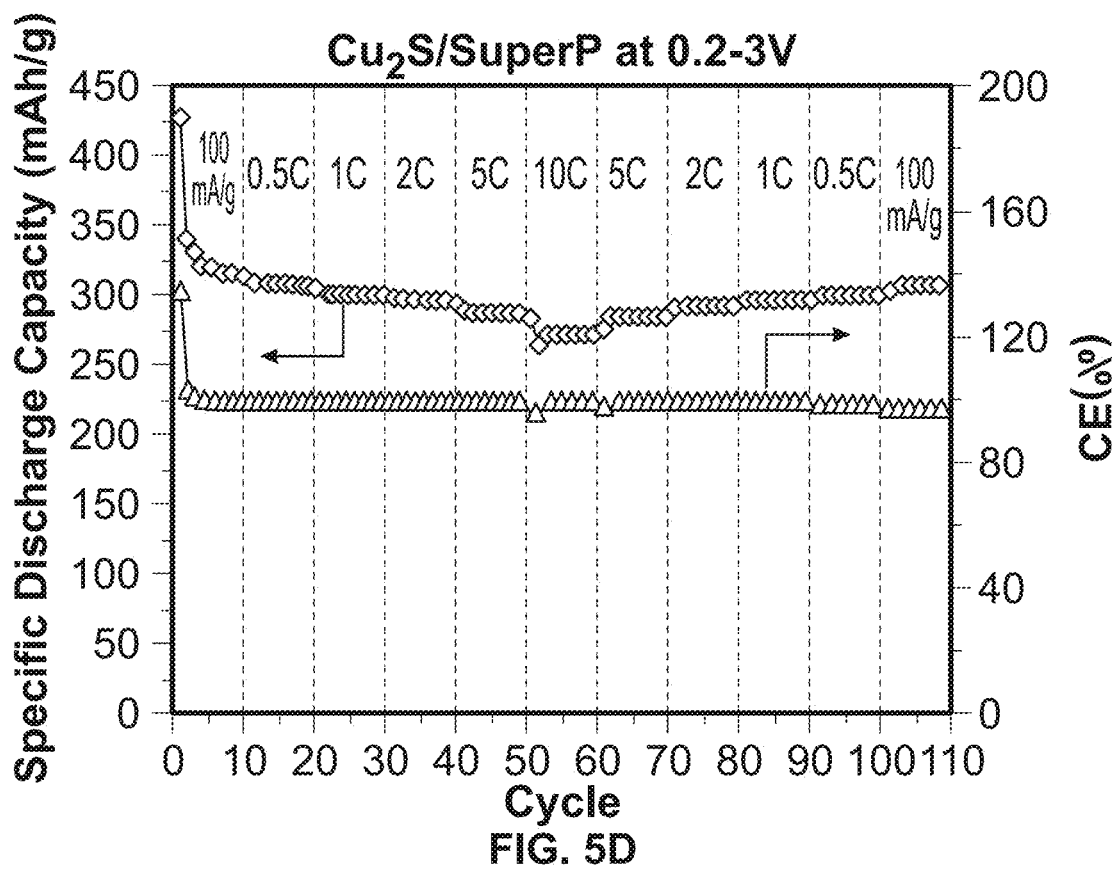
Figure 6A:
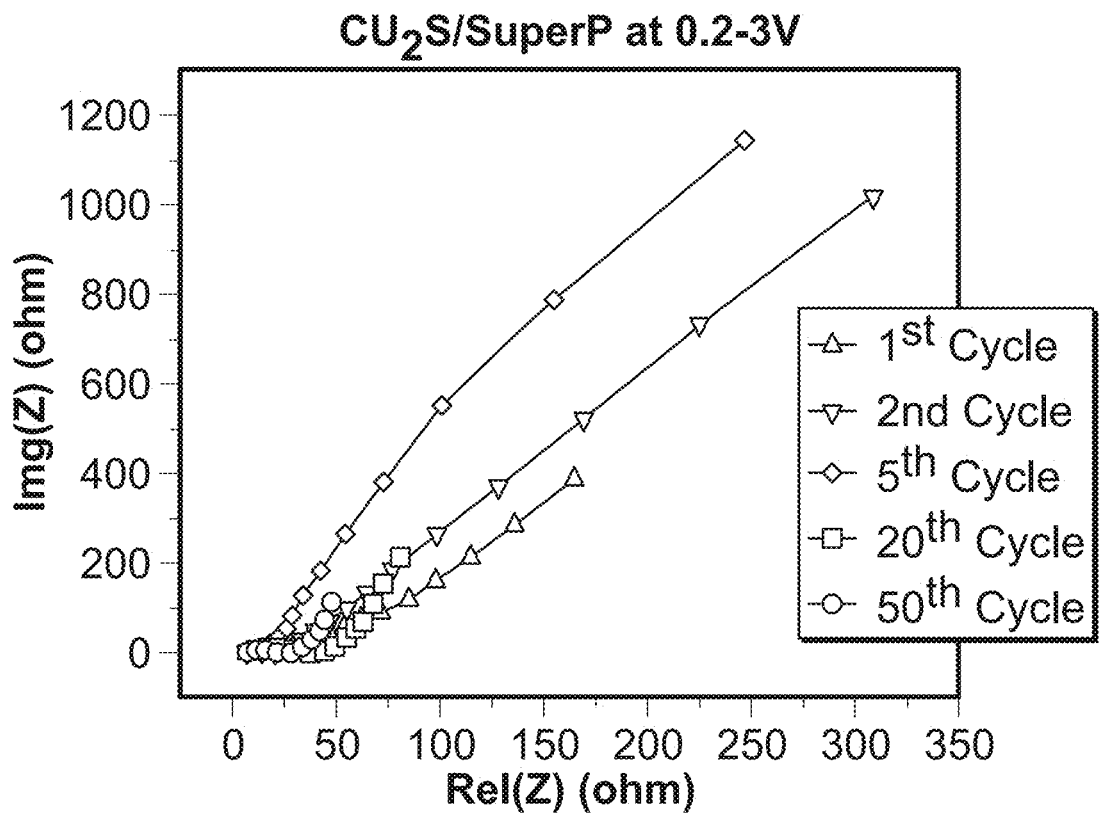
FIGS. 6A, 6B, 6C, 6D, 6E and 6F are Nyquist plots from EIS measurements during 50 cycles of a Na—Cu₂S/SuperP cell under (a) 0.2-3 V and (b) 0.4-3 V versus Na/Na⁺. (c) $R_{SEI}$ film resistance in Na—Cu₂S/SuperP cell shows as functions of either cutoff voltage or cycle number. Nyquist plot from EIS measurements during 50 cycles of a Na—Cu₂S/NGS cell under (d) 0.2-3 V and (e) 0.4-3 V versus Na/Na⁺. (f) $R_{SEI}$ film resistance in Na—Cu₂S/NGS cell shows as functions of either cutoff voltage or cycle number.
Figure 6B:
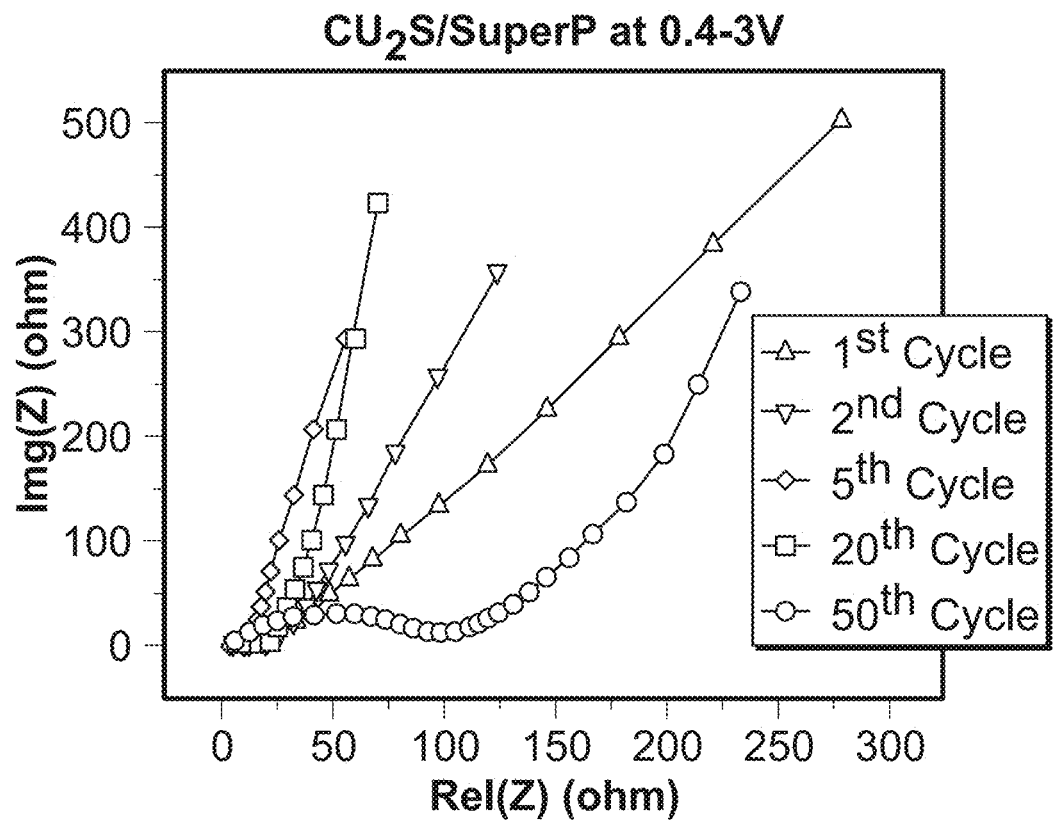
Figure 6C:
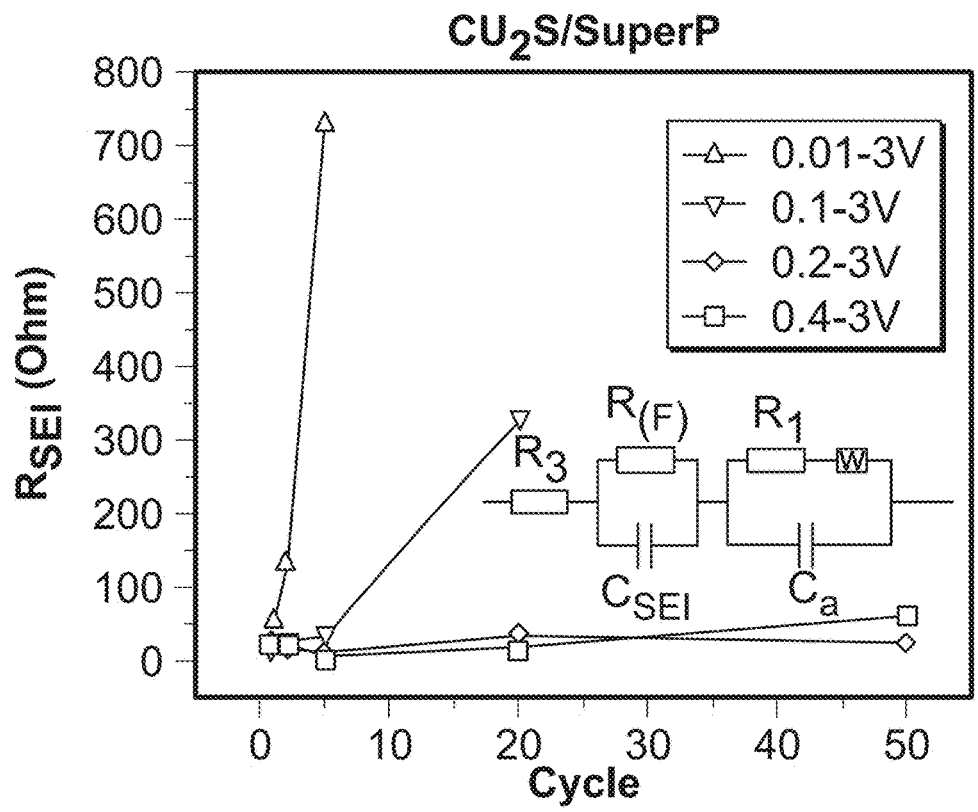
Figure 6D:
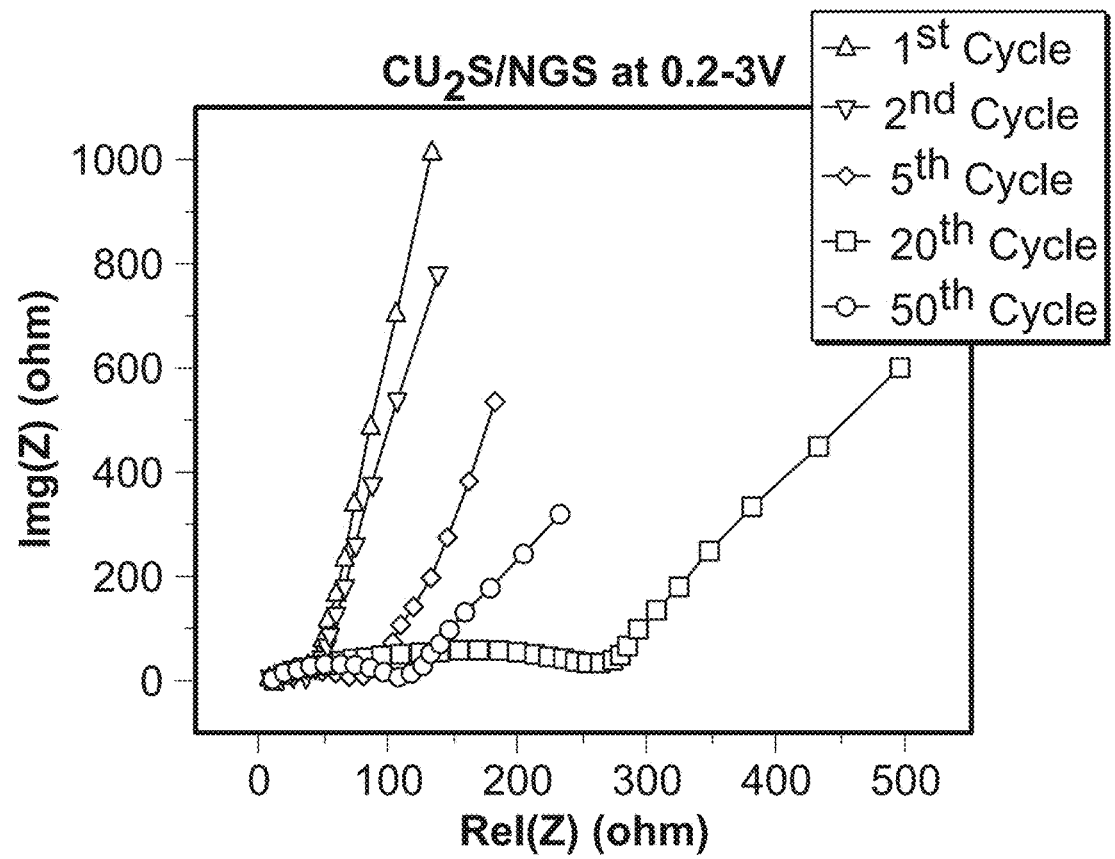
Figure 6E:
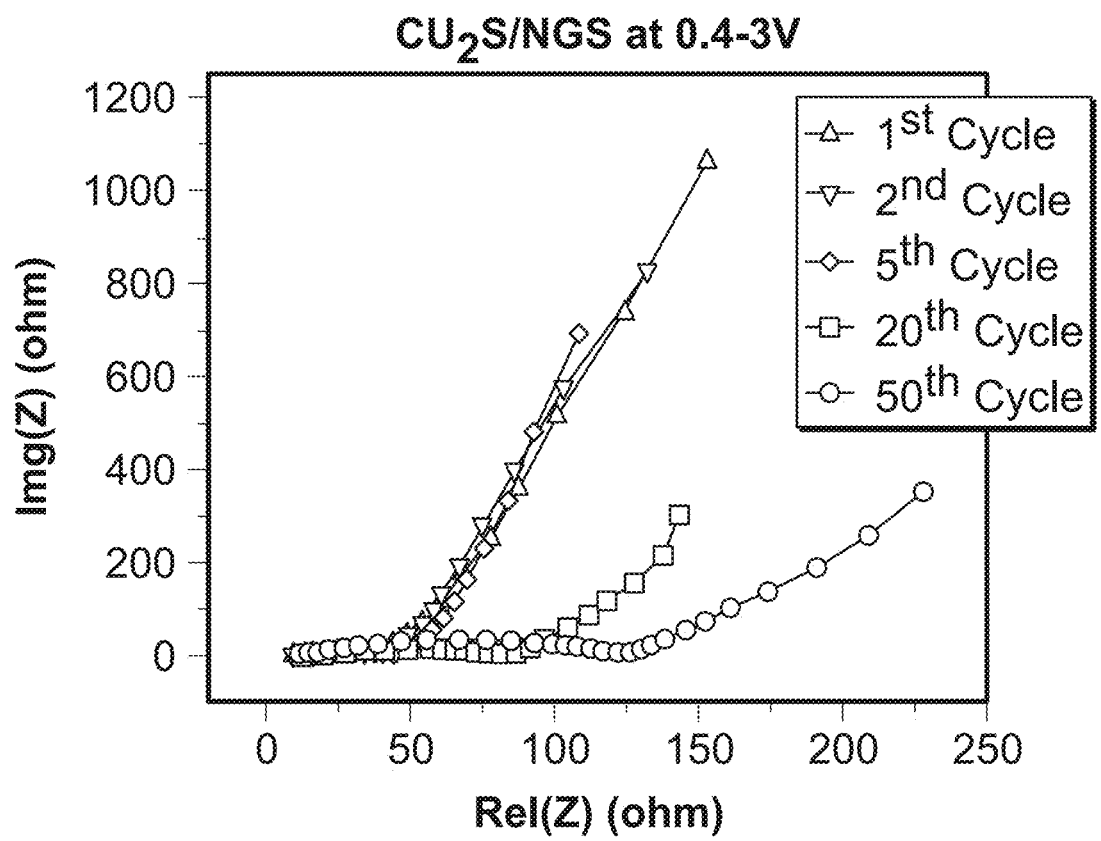
Figure 6F:
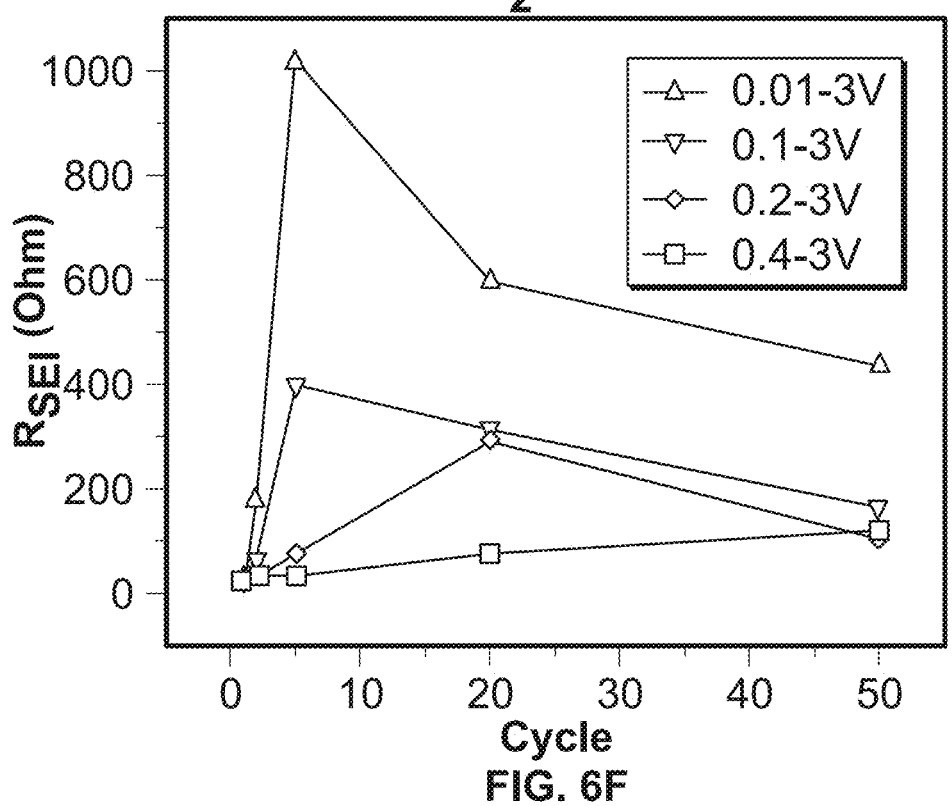

The ex-situ XRD results in FIG. 4B also confirmed two side reactions at 0.13 and 0.01 V, as illustrated in the CV profiles of FIG. 2C. The side reactions should be responsible for SEI formation. The stability of SEI is related to the performance of both the $Cu_2S$/SuperP and $Cu_2S$/NGS electrodes. A stable SEI is beneficial for achieving high performance of $Cu_2S$ electrodes. Otherwise, an unstable SEI will degrade the performance of $Cu_2S$ electrodes quickly. The SEI formation is always associated with electrolyte deposition and lithium consumption. The electrochemical performance (including cyclability, stability, rate capability and impedance) was investigated due to different discharge cutoff voltages (0.01, 0.2, and 0.4 V) on both the electrodes of $Cu_2S$/SuperP and $Cu_2S$/NGS. FIG. 5A shows the cyclability and CE of the $Cu_2S$/SuperP electrode, while FIG. 5C shows the cyclability and CE of the $Cu_2S$/NGS electrode. Apparently, the 0.2 V discharge cutoff voltage dramatically improved the cyclability and stability of $Cu_2S$/SuperP electrode (302 mAh $g^{-1}$ and 96% CE at 120 cycles) and $Cu_2S$/NGS (313 mAh $g^{-1}$ and 98% CE at 450 cycles). A higher discharge cutoff voltage further improved the cyclability and stability but sacrificed some capacity. EIS tests in FIGS. 6A through 6F also validated the SEI-suppressing effect of high discharge cutoff voltage on the SEI formation. The resistance of SEI layer calculated from those Nyquist plots exhibited a remarkable decrease as applying a cutoff voltage of >0.2 V. It validates that discharge cutoff voltage could significantly suppress the formation of an unstable SEI layer. In addition, rate capacity was also tested for both electrodes. FIGS. 5B and 5D show excellent capacity retention at high rates up to 10 C for both electrodes. However, FIG. 5B reveals that $Cu_2S$/SuperP electrode suffers some low CE at high rates of >5 C using a 0.2 V discharge cutoff voltage, possibly due to the polysulfide shutting issue. In comparison, the $Cu_2S$/NGS electrode exhibits an extremely stable high-rate performance (especially at 10 C) using a 0.2 V cutoff voltage, as illustrated in FIG. 5D.

In order to further suppress the formation of the SEI layer, as shown in FIG. 1E, a coating 300 may be applied to graphene-based material 204A-204G. The coating may be chemically inert to electrolyte and prevents the anode material from reacting with electrolyte. Coating 300 may be applied by ALD.

In a preferred embodiment, coating 300 is a metal or a metal oxide. In another preferred embodiment the metal oxide may be $Al_2O_3$ is $Al_2O_3$, $ZrO_2$, $TiO_2$, $HfO_2$ and combination thereof.

Figure 7A:
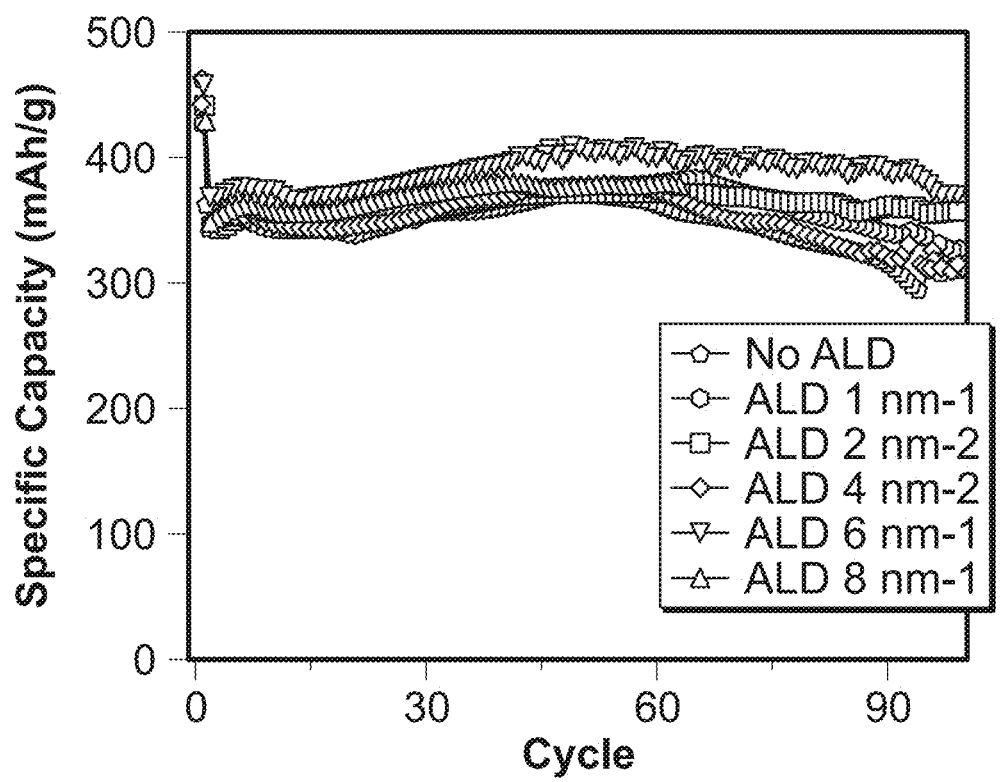
FIGS. 7A, 7B, 7C, 7D, 7E and 7F are comparisons of specific discharge capacity vs. cycles for pristine Cu₂S/NGS electrodes and the electrodes with ALD Al₂O₃ coating of 1, 2, 4, 6, and 8 nm. Nyquist plot from EIS measurements during 50 cycles of a Na-ALD/Cu₂S/NGS cell with the Al₂O₃ coating of (b 1 nm, (c) 2 nm, (d) 4 nm, (e) 6 nm, and (f) 8 nm at the cutoff voltage of 0.01-3 V versus Na/Na⁺.
Figure 7B:
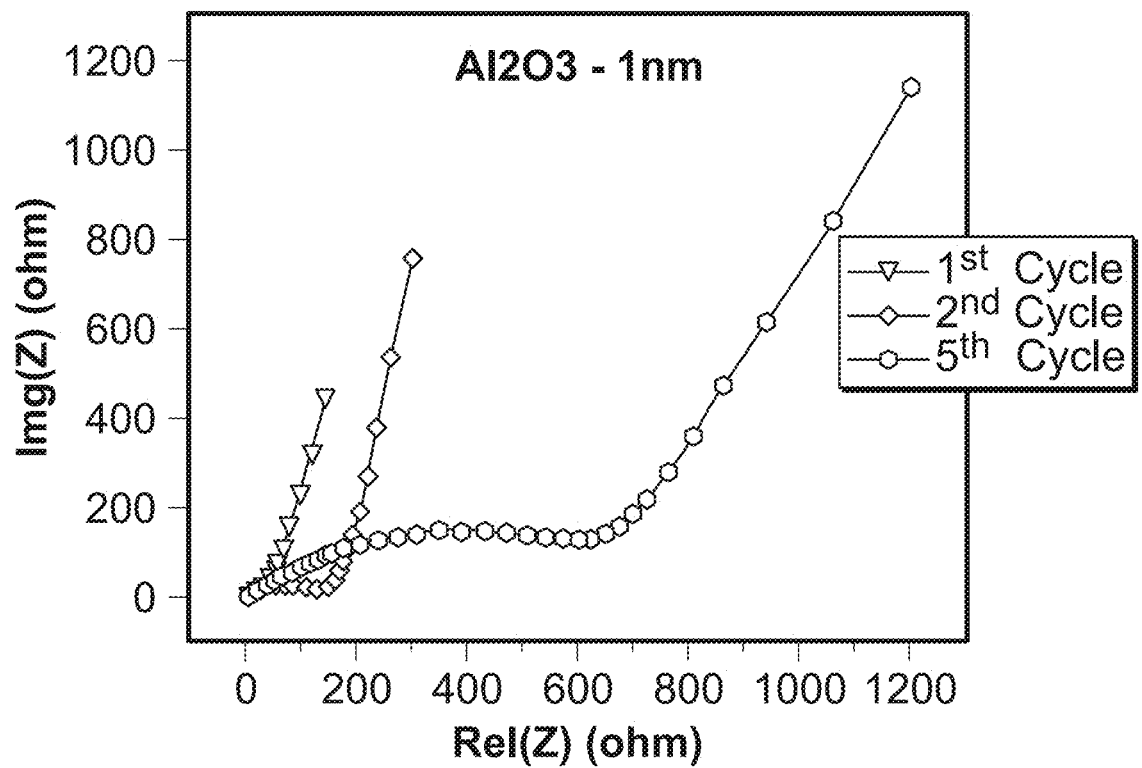
Figure 7C:
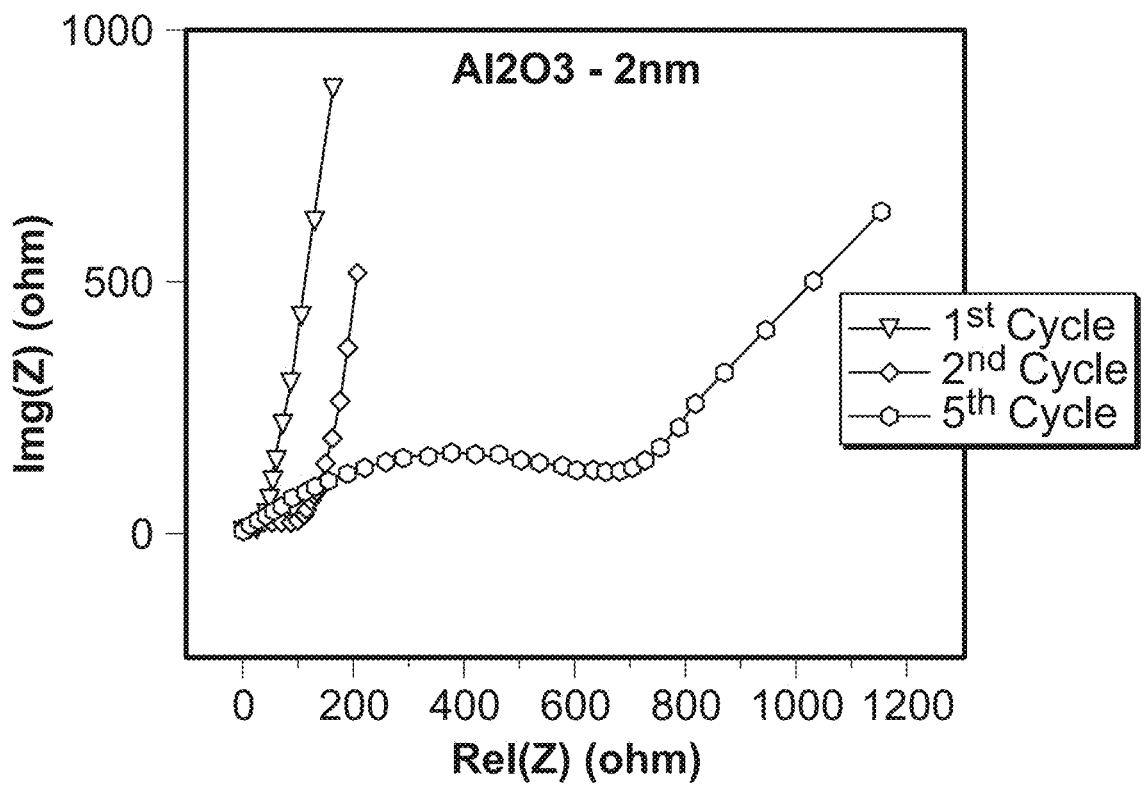
Figure 7D:
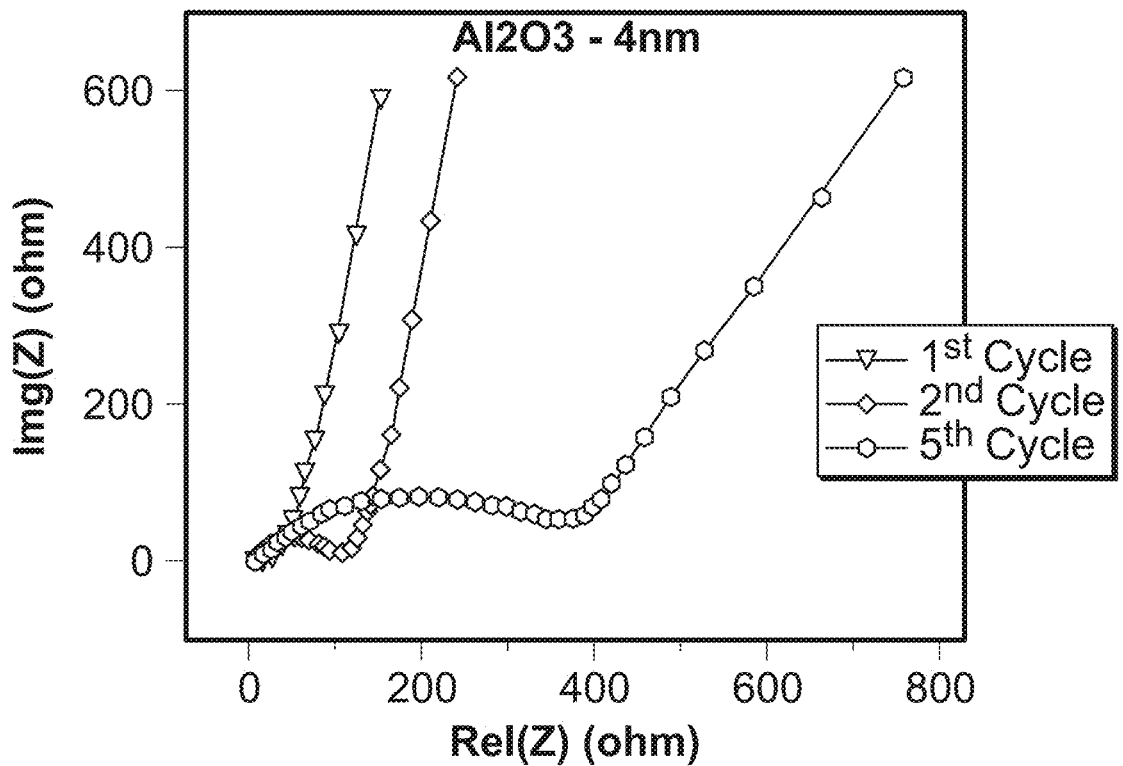
Figure 7E:
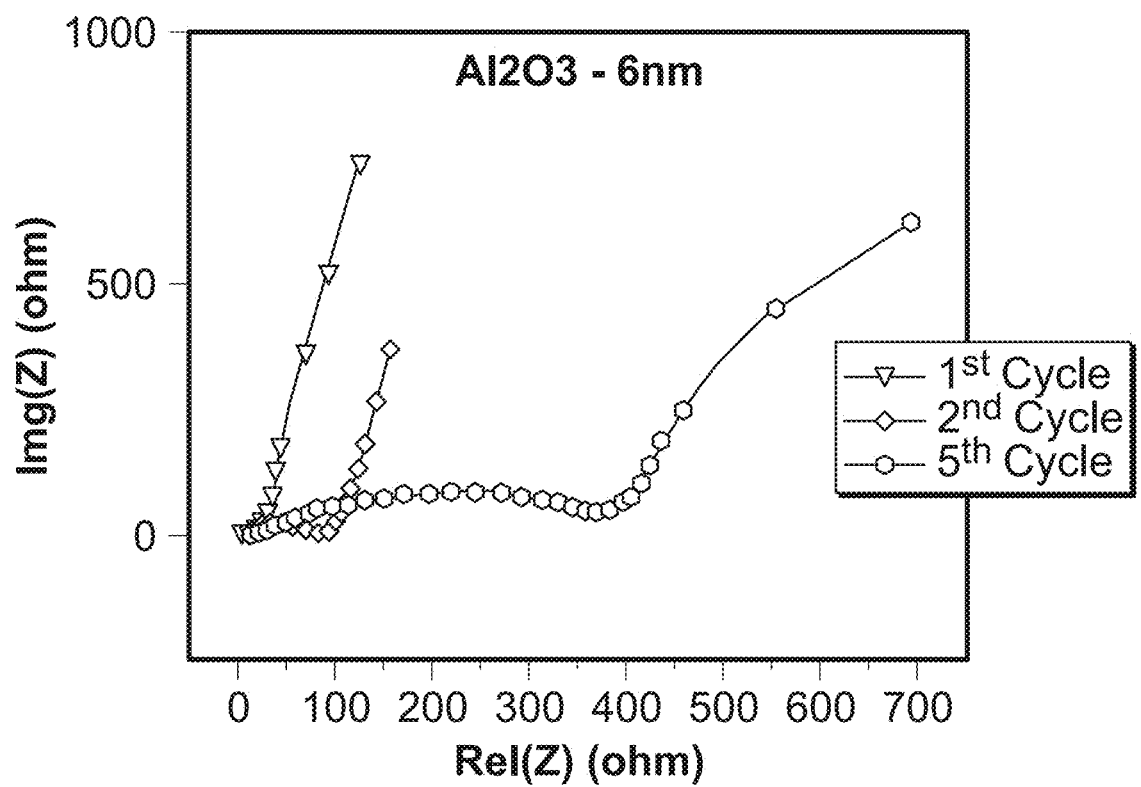
Figure 7F:
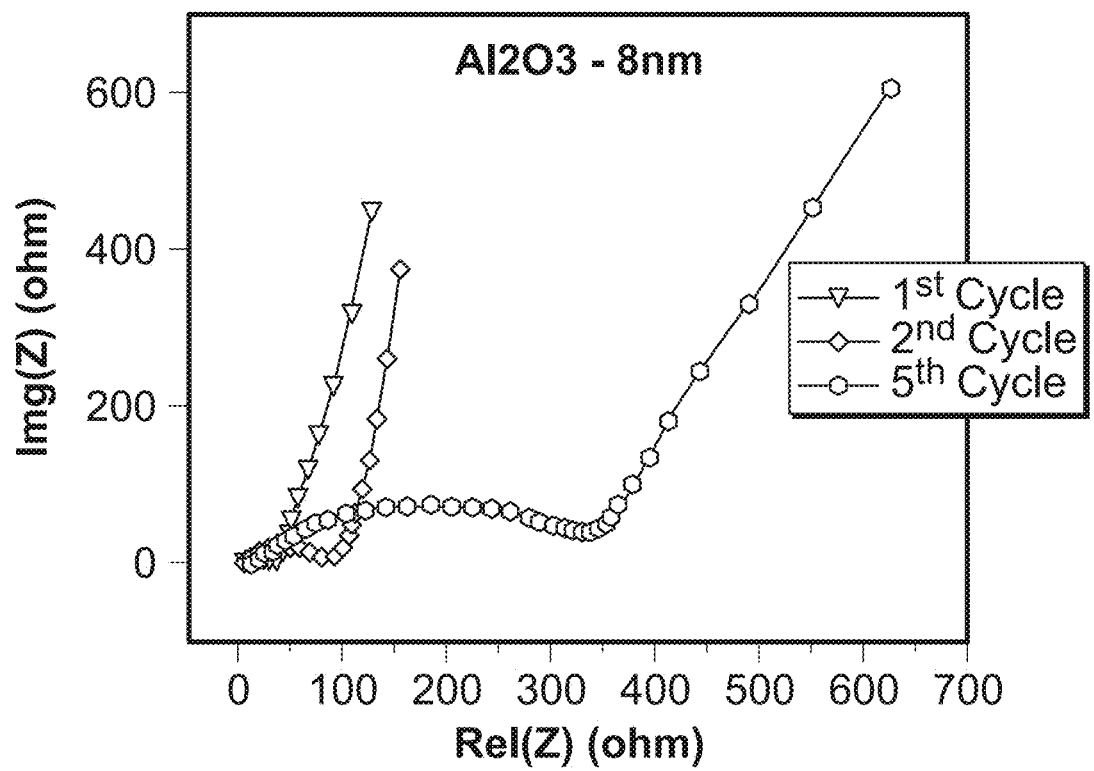

FIG. 7A compares the pristine $Cu_2S$/NGS electrode and the electrodes coated with $Al_2O_3$ coatings of 1, 2, 4, 6, and 8 nm in thickness. Apparently, $Al_2O_3$ coating thicker than 2 nm can effectively hinder the capacity fading of $Cu_2S$/NGS electrodes. Among all electrodes, the electrode with a 6-nm $Al_2O_3$ coating delivers the highest specific capacity after 100 cycles. However, a coating thicker than 6 nm resulted in a lower capacity than that of the electrode with a 6-nm thick coating. This may be due to some limited diffusion of $Na^+$ to $Cu_2S$ with a thick coating of 8 nm. In addition, the effect of ALD coating on the interfacial state was also examined by measuring EIS. Compared to the pristine electrode in FIG. 2e, the impedances versus cycle with $Al_2O_3$ coatings were significantly reduced as the coating thickness thicker than 4 nm, as shown in FIG. 7b-f. However, no more decrease in impedance when further increasing the coating thickness in FIG. 7D-7F. To summarize, a 6-nm thick $Al_2O_3$ coating via ALD shows the optimal performance in boosting the performance of the $Cu_2S$/NGS electrode.

The embodiments of the present invention deploy a technical route via ball milling to make superior $Cu_2S$ anodes, in which NGS is used to replace SuperP as the conductive agents. In addition, NGS may serve as a physical barrier to inhibit S shuttling and SEI formation. Compared to the NGS/SuperP electrode, the $Cu_2S$/NGS electrode enables superior performance, including long-term cyclability, high efficiency, and high sustainable capacity. This may be ascribed to the multiple roles played by NGS. A cutoff voltage at 0.2 V also helped $Cu_2S$/NGS electrode to accomplish better performance, i.e., a sustainable capacity of ~300 mAh $g^{-1}$ and 98% CE for over 450 cycles at 100 mA $g^{-1}$. It also helps to achieve high-rate capability up to 10 C (equivalent to 3.37 A $g^{-1}$). Moreover, a conformal and uniform $Al_2O_3$ coating via ALD further suppresses SEI formation and improves $Cu_2S$ performance, enabling better electrochemical performance using the voltage window of 0.01-3 V.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:
1. An anode comprising:
   a current collector;

an anode material, said anode material is $Cu_2S$;
a graphene-based material, said graphene-based material covers said anode material, and
said graphene-based material includes a plurality of N-doping sites.

* * * * *